US006672075B1

(12) United States Patent
Sandu et al.

(10) Patent No.: US 6,672,075 B1
(45) Date of Patent: Jan. 6, 2004

(54) LIQUID COOLING SYSTEM FOR GAS TURBINES

(75) Inventors: Constantin Sandu, Bucuresti cod (RO); Dan Brasoveanu, Baltimore, MD (US)

(73) Assignee: University of Maryland, Riverdale, MD (US)

( * ) Notice: Subject to any disclaimer, the term of this patent is extended or adjusted under 35 U.S.C. 154(b) by 28 days.

(21) Appl. No.: 10/197,434

(22) Filed: Jul. 18, 2002

(51) Int. Cl.[7] .............................................. F02C 7/16
(52) U.S. Cl. ........................................ 60/806; 415/114
(58) Field of Search .................. 60/805, 806; 415/114, 415/175, 176, 178

(56) References Cited

U.S. PATENT DOCUMENTS

| | | | | |
|---|---|---|---|---|
| 3,355,883 A | * | 12/1967 | Beam | 60/806 |
| 3,756,020 A | * | 9/1973 | Moskowitz et al. | 415/114 |
| 4,190,398 A | * | 2/1980 | Corsmeier et al. | 415/114 |

OTHER PUBLICATIONS

Popa, B., Teill, H., Madarasan, T.; Schimbatoare de Caldura Industriale, Editura Technica Bucuresti, 1st Edition, 1977, pp. 237–239 & 348.
Brown, W.B., Livingood, J.N.B.; Cooling of Gas Turbine III–Analysis of Rotor and Blade Temperatures in Liquid–Cooled Gas Turbines, NACA Research Memorandum, 1947.
Brown, W.B., Monroe, W.R., Cooling of Gas Turbines IV–Calculated Temperatures Distribution in the Trailing Part of a Turbine Blade, NACA Research Memorandum, 1947.
Raznjevic, K.; Tabels SI Diagrame Termodinamice, Editura Tehnica, Bucuresti, 1978.
Stefanescu, D., et al.; Transmisia de Caldura, Editura Institutului Politehnic Bucuresti, Bucuresti, vol. VII–2, pp. 461 & 463.
Pimsner, V., Vasilescu, C.A., Petcovici, A; Termodinamics Technica, Editura Didactica si Pedagogica, Bucuresti, 1976, pp. 151–153.
Jiritzki, G.S., et al; Gazovie Turbini Aviatzonih Dvigately, Ed. Oboronghiz, Moskva, 1963, pp. 304–305.
Kerrebrock, J.L., Sticker, D.B.; Vaporization Cooling for Gas Turbines, The Return–Flow Cascade, ASME, 1998.
Baranescu, G., Calculul Processelor de Ardere, pp. 255 & 267.
Wang, T., Gaddis, J.L., Guo, T., Li, X.; Closed–Loop Mist/System Cooling for Advanced Turbine Systems, Dept. Mech. Engineering, Clemson University.
Weigand, B., Semmler, K., von Wolfersdorf, J., Heat Transfer Technology for Internal Passages of Air–Cooled Blades for Heavy–Duty Gas Turbines, U. of Stuttgart.
Han, J., Dutta, S; Recent Developments in Turbine Blade Internal Cooling.
Gehrer, A., Woisetschlager, J., Jericha, H., Blade Film Cooling by Underexpanded Transonic Jet Layers, ASME, 1997.

* cited by examiner

Primary Examiner—Louis J. Casaregola
(74) Attorney, Agent, or Firm—Rosenberg, Klein & Lee

(57) ABSTRACT

Cooling systems with liquid for gas turbine engines use the relative motion of the engine stator with respect to the rotor for actuating the coolant pump. The cooling system is completely encapsulated within the engine rotor. The cooling system includes a tank containing the cooling liquid, a coolant pump coupled to the tank to extract the cooling liquid from the tank, a system of ducts and channels extending in the rotor shaft, and rotor disks and rotor blades, where the heat exchanger is positioned either in the compressor drum, or in the end of compressor section.

15 Claims, 19 Drawing Sheets

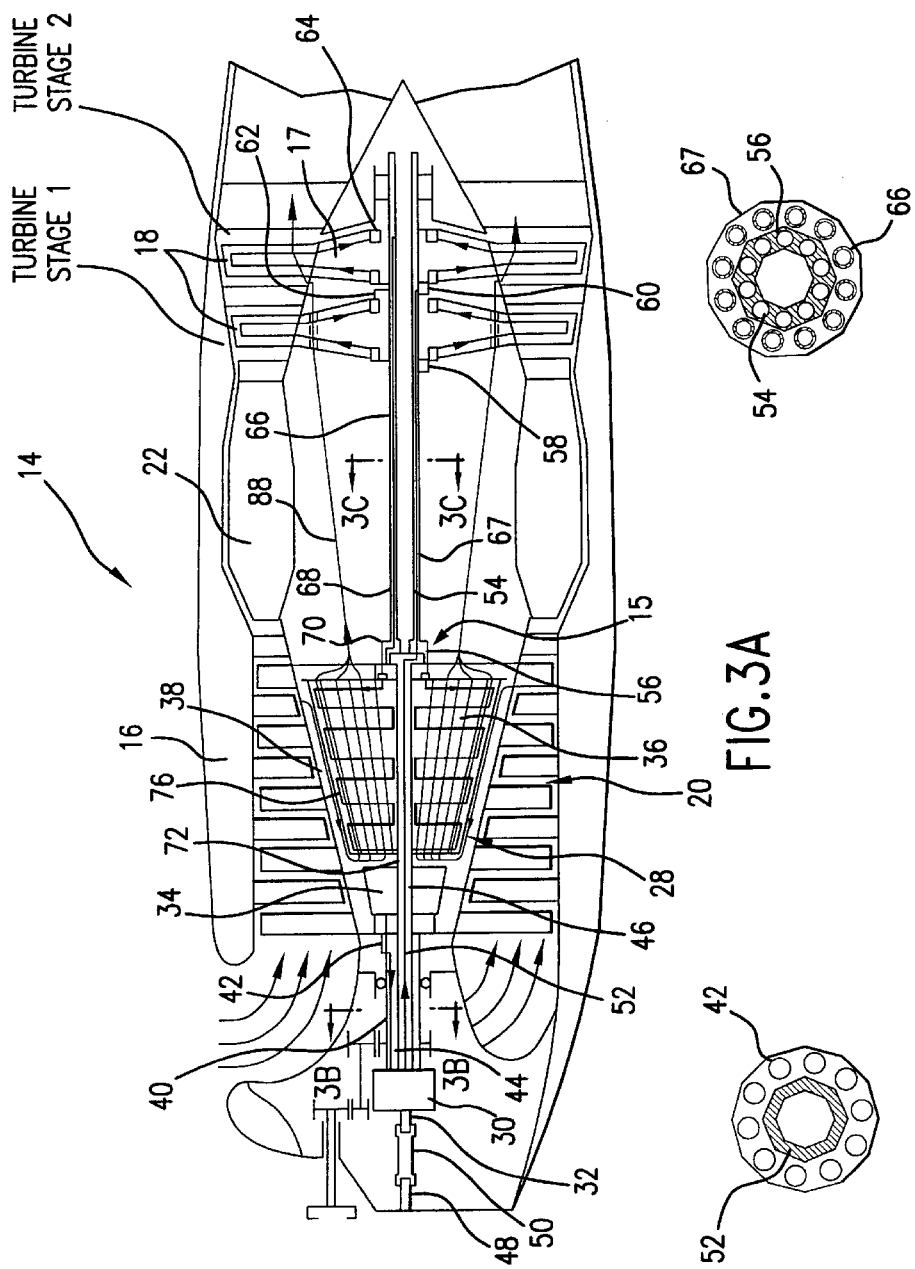

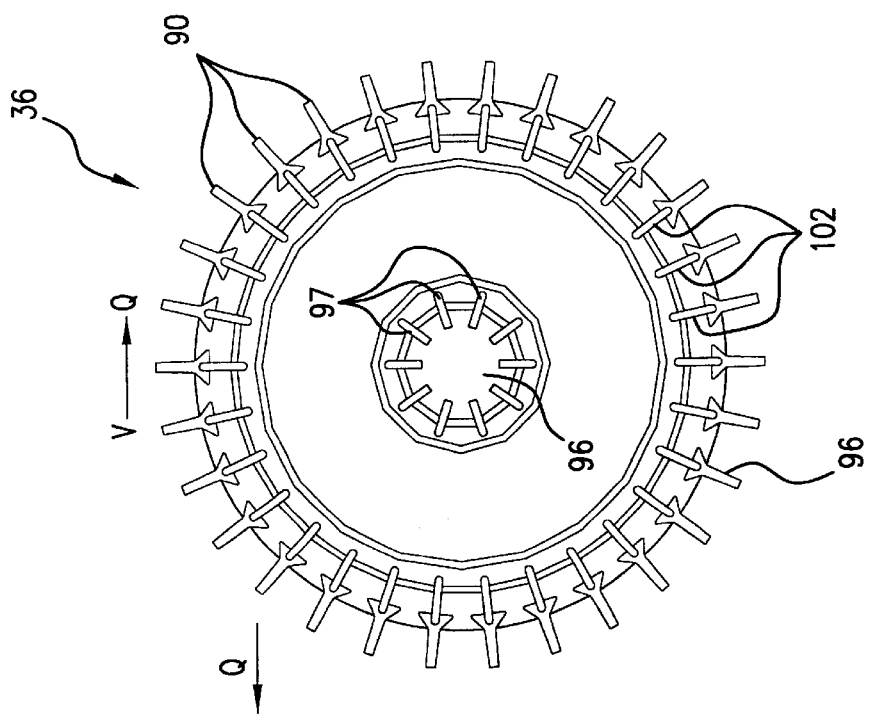
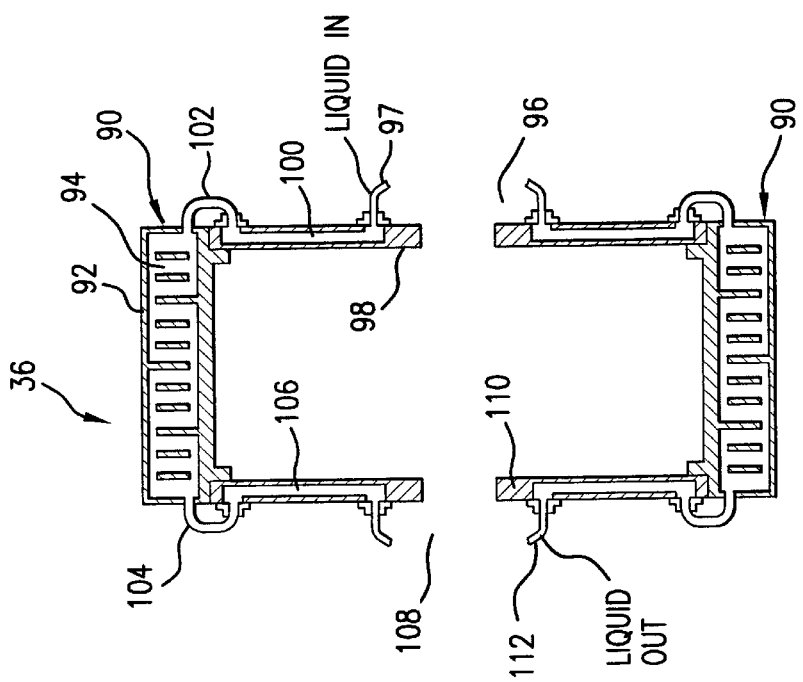

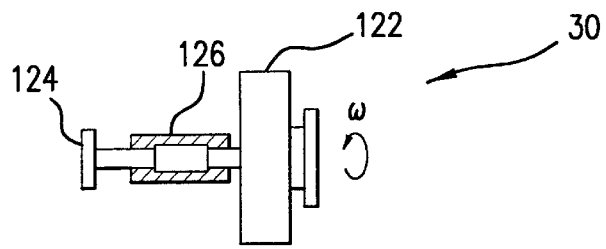
FIG.11A
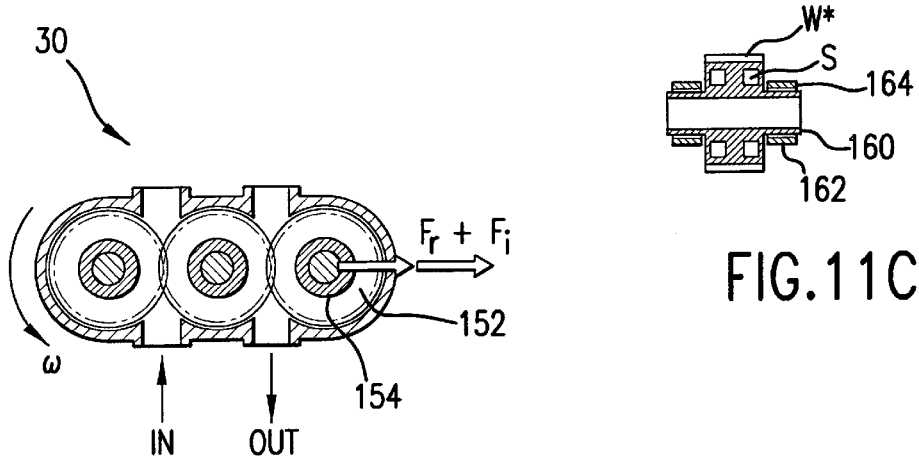
FIG.11B
FIG.11C
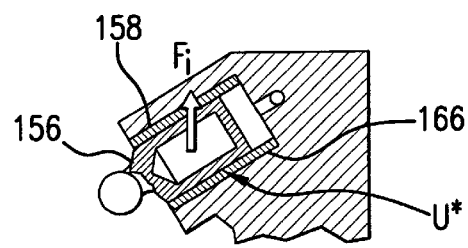
FIG.11E
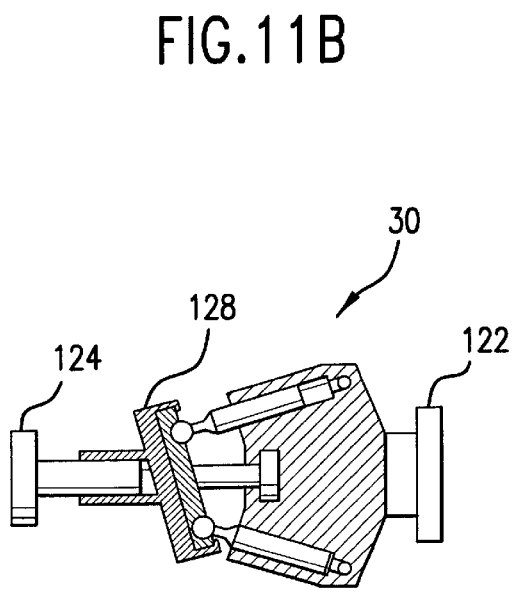
FIG.11D

LIQUID COOLING SYSTEM FOR GAS TURBINES

FIELD OF THE INVENTION

The present invention relates to turbines, and more particularly to gas turbines with a liquid cooling system encapsulated into the turbine rotor.

The present invention further relates to a liquid cooling system which includes a tank containing a cooling liquid and a coolant pump coupled to the tank for forced recirculation of the coolant liquid along the channels formed in the rotor shaft and through the rotor disks and blades of the turbine, and wherein the coolant pump is actuated as a result of relative motion of the stator with regard to the rotor of the turbine.

The present invention also relates to a turbine liquid cooling system which includes a heat exchanger positioned in a compressor section of the turbine, either in a compressor drum, or at the end of the compressor section, or the combination thereof, and wherein, being positioned at the end of the compressor section, the heat exchanger may use the blade thereof or the blade of the compressor for cooling purposes.

BACKGROUND OF THE INVENTION

As known to those skilled in the art, a gas turbine is a heat engine that converts a portion of the fuel energy into work by using gas as the working medium which commonly delivers its mechanical output through a rotating shaft. In the typical gas turbine, the sequence of thermodynamic processes consists basically of compression, addition of heat in a combustor, and expansion through a turbine. This basic operation of the gas turbine may be modified through the addition of heat exchangers and multiple components for reasons of efficiency, power output, and operating characteristics. In order to achieve an overall performance of the turbine, each process is carried out in the engine by a specialized component.

As shown in FIG. 1A, a typical turbine 1 includes: a rotor 2 having a rotating shaft 3 with disks 4 and blades 5, attached thereto, a stator 6, as well as a combustor 7, and a compressor 8.

In operation, air for the combustion chamber 7 is forced into the turbine by the compressor 8. In the combustor 7, fuel is mixed with the compressed air and is burned. Heat energy, thus released, is converted by the turbine into rotary energy.

High emission temperature of the combustion product generally necessitates excess air to cool the combustion product to the allowable turbine inlet design temperature. To improve efficiency, heat exchangers may be added to the gas turbine exhaust to recover heat energy and return heat to the working medium after compression and prior to heat combustion.

Two basic types of compressors are used in gas turbines, namely, axial and centrifugal. In a few special cases, a combination type known as a mixed wheel, which is partially centrifugal and partially axially, is used.

Combustors, sometimes referred to as combustion chambers, for gas turbines take a wide variety of shapes and forms. All contain nozzles to meter the fuel to the gas stream and to atomize or break up the fuel stream for efficient combustion. In addition to being designed to burn the fuel efficiency, the combustors also uniformly mix excess air with the products of combustion to maintain a turbine at a uniform lower temperature. The combustor brings the gas to a controlled uniform temperature with a minimum of impurities and a minimum loss of pressure.

The turbine itself includes the rotor 2 with turbine disks 4 and blades 5 thereon, and a stopper. Two types of gas turbine disks are generally used, namely, radial-in-flow and axial-flow. Small gas turbines usually use a radial flow disk, while for larger volume flows, axial turbine disks are used almost exclusively. Although some of the turbines are of the simple impulse type, most high performance turbines are neither pure impulse nor pure reaction. The high performance turbines are normally designed for varying amounts of reaction and impulse to the optimum performance.

Gas turbines are typically provided with subsystems of control and fuel regulation. The primary function of the subsystem that supplies and controls the fuel is to provide clean fuel, free of vapor, at a rate appropriate to engine operation conditions. These conditions may vary rapidly and over a wide range. As a consequence, fuel controls for gas turbines are, in effect, special purpose computers employing mechanical, hydraulic, or electronic means, with all three in combination being frequently used.

All gas turbines employ some kind of cooling to various extent and use a liquid or gas coolant to reduce the temperature of the metal parts. The cooling system varies from the simplest form where only first stage disk cooling is involved to the more complex systems where the complete turbine (rotor, stator and blades) is cooled. Two basic types of heat exchangers are used in gas turbines, namely, gas-to-gas and gas-to-liquid. An example of the gas-to-gas type is the regenerator which transfers heat from the turbine to the air leaving the compressor. The regenerator must withstand rapid large temperature changes and must have low-pressure drop. Intercoolers, which are used between stages of compression are generally air-to-liquid units. They reduce the work of compression and the final compressor discharge temperature. When used with a regenerator, they increase both the capacity and efficiency of a gas turbine of a given size.

The thermal efficiency of gas turbines is critically dependent on the temperature of burnt gases at the turbine inlet. The higher temperature generally results in a higher efficiency. Stochiometric combustion would provide maximum efficiency, however in the absence of an internal cooling system, turbine blades cannot tolerate gas temperatures that exceed 1300 K. For this temperature, the thermal efficiency of turbine engine is only 52%. Conventional air-cooling techniques of turbine blades allow inlet temperatures of about 1500 K on current operating engines yielding thermal efficiency gains of about 4%. Newer designs, that incorporate advanced air-cooling methods allows inlet temperatures of 1750–1800 K, with a thermal efficiency gain of about 3.5% compared to current operating engines. This temperature is near the limit allowed by air-cooling systems.

Turbine blades may be cooled with air taken from the compressor or by liquid. Cooling systems with air are easier to design but have a relatively low heat transfer capacity and reduce the efficiency of the engine. Some cooling systems with liquid rely on thermal gradients to promote re-circulation from the tip to the root of turbine blades. In these cases, the flow and cooling of liquid are restricted. For optimum results, cooling systems with liquid (shown in FIG. 1B) should use a pump 9 to recirculate the coolant 10 contained in coolant tank 11 and a heat exchanger 12 to cool the liquid. In the past, designers have tried to locate the pump 9 on the engine stator 6 and, therefore were unable to avoid high coolant losses through seals 13' and 13" since it has been found to be impossible to reliably seal the stator-rotor interface.

The Carnot cycle provides the theoretical limit for the thermal efficiency of any heat engine. This limit, $\eta_{Carnot}$, is given by $$\eta_{carnot} = 1 - \frac{T_L}{T_H} \quad (1)$$

where $T_L$ is the absolute temperature of the low-temperature reservoir, and $T_H$ is the absolute temperature of the high-temperature reservoir.

For gas turbine engines, maximum thermal efficiency, $$\eta_1^{(max)} = 1 - \sqrt{\frac{T_1^*}{T_3^*}} \quad (2)$$

where $T_1^*$ and $T_3^*$ are the total temperature at compressor and turbine inlet, respectively. Therefore, increasing the temperature at the turbine inlet is the most advantageous method for improving the efficiency and power of gas turbine engines. Simultaneously, the specific weight and frontal area of the engine decrease. The improvement of these two performance parameters is especially important for aeroengines.

The design of turbine engines has been continuously perfected for many years. Newer engines have been designed which are more powerful and more efficient as the need has arisen. Nevertheless, during the last twenty years, engine designers have been increasingly held back by the law of diminishing returns. On the average, despite sustained efforts, from 1970 to 1997, $T_3^*$ has increased by only 10K per year.

The control of blade temperature is an important aspect of turbine cooling. Turbine vanes are fixed and therefore can be easily cooled using known methods (including liquid systems) and are subject to little mechanical stress. In contrast, rotor blades are simultaneously subject to high levels of both mechanical and thermal stress. The mechanical stress is due to gas pressure, high centrifugal force and vibration. Thermal stress is due to heat transfer from burnt gases and is especially severe at the leading and trailing edge of the rotor blade. A blade is designed to work at the mechanical limit of the material. For this reason, in parallel with research on material science, great efforts have been made to improve the cooling of rotor blades. Most performance parameters (such as thermal efficiency and thereby overall engine efficiency, specific fuel consumption, weight, thrust and frontal area of the engine) depend on $T_3^*$. This temperature is limited by the heat transfer capacity of the system used for cooling the turbine blades. Therefore, it is an important design consideration to improve this cooling system.

Most current systems use air as a coolant. There are three basic air-cooling systems, namely, convection, film, and transpiration cooling. In convection cooling, cold air is brought from compressor through openings. This air cools the turbine disc, then circulates through holes or openings within the blade toward the blade tip and exits through the leading and trailing edge or through the blade tip. Due to mechanical and manufacturing constraints, blades have a limited internal cooling surface and air is generally not an efficient cooling fluid. When the temperature at turbine inlet becomes very high, the amount of air required for cooling increases to an unacceptable level. Film cooling systems blast cold air on the external surface of turbine blades. A drawback of this system is the difficulty of controlling the flow of cold air around the blade surface. Therefore, designers generally agree that further research on air based cooling systems would yield only marginal $T_3^*$ gains. The maximum temperature at turbine inlet provided by air-cooling systems is about 1800 K and can be sustained only for a limited time.

Currently, transpiration (effusion) cooling is to a great extent the method of choice. This system attempts to isolate turbine blades from burnt gases using a thin layer of low temperature air. In this case, blades must be coated with a porous material in order to allow the air efflux. Therefore this cooling system faces daunting challenges. The porous material is subject to excessive wear, fatigue and corking and has to be internally cooled by the same airflow. The porous coating has a reduced strength, while the maximum mechanical and thermal stress is reached on the blade surface. The air film disturbs the flow pattern of burnt gases leading to power losses. Due to mechanical vibrations and combustion processes, the flow of burnt gases is turbulent, therefore, the thin layer of relatively cold air is difficult to maintain. The porous layer is further exposed to erosion caused by flow and corrosive attack due to reactive gases present in burnt gases, especially sulfur compounds and oxidants. In time, these phenomena reduce the strength, thickness and continuity of the porous layer. In addition, burnt gases contain a degree of impurities. These impurities are generally in a plastic state due to the high gases temperature and occlude the external pores of the blade. As a result, cooling is greatly reduced.

Liquid cooling systems have been tested from the beginning of the design of turbines, together with air-based systems. As late as the 1950s, liquid cooling systems were regarded as having the greatest potential. In general, engine designers have placed the liquid tank, pump and heat exchanger on the engine stator. Referring to FIG. 1B, the cooling liquid 10 is aspired from the tank 11, then directed through a duct to the first stator/rotor sealing 13'. Through this seal, the liquid enters the engine rotor 2, initially cools the turbine disc 4, passes through radial holes into the blades 5, and returns to the engine stator 6 through a second seal 13". Special ducts direct the hot liquid that has returned from the rotor 2 to the heat exchanger 12. Cool liquid exits from the heat exchanger 12 and returns to the tank 11 with the cycle being repeated. Distilled water was the liquid used during early experiments. Water was vaporized within turbine blades 5 and therefore the second seal 13" did not prevent excessive coolant losses. Other significant losses occurred through the first seal 13'. The high volume of the heat exchanger 12 increased the frontal area of the engine, a feature that reduces aircraft performance. For these reasons, cooling systems based on forced recirculation of liquid have fallen by the wayside.

Open loop systems that spray liquid from the stator vanes on the blades have been investigated. The open loop systems require a prohibitive amount of coolant (especially for aero-engines), cool incompletely and are difficult to control. Recently, General Electric designed an open loop cooling system with steam. Unfortunately this system is limited to terrestrial power applications.

For an extended period of time, design engineers were attracted by promoting liquid recirculation using density variations (thermosyphon cooling). This concept has basic design consideration problems. Due to space constraints, the heat exchanger has a small surface and the presence of ribbed legs reduces the disc strength. Nevertheless, this concept does contain the seed of a successful solution, since the engine rotor contains the entire cooling system thereby stator/rotor seals are eliminated.

For temperatures above 2000 K, another problem becomes apparent. Heat transfer through radiation becomes significant. Highly turbulent gas flow also promotes heat transfer through radiation. As a consequence, even monocrystal blades reach their melting temperature if air is used for cooling. Conventional fuels can provide temperatures in excess of 2300 K, while hydrogen would provide more than 2500 K. Temperatures at turbine inlet on current operating engines fall below the former level by more than 600 K.

Traditional methods of increasing temperature at the turbine inlet have been substantially exhausted and a new approach, based on non-traditional concepts is clearly needed to alleviate the aforementioned disadvantages.

SUMMARY OF THE INVENTION

It is therefore an object of the present invention to provide a liquid cooling system for a gas turbine where the liquid cooling system is incorporated in the turbine rotor, and where the operation of such a liquid cooling system is possible due to relative motion between the stator and the rotor of the turbine.

It is another object of the present invention to provide a liquid cooling system for a gas turbine which includes a tank containing a cooling liquid and a coolant pump coupled to the tank to extract the cooling liquid therefrom and to promote the cooling liquid through the rotor shaft, rotor disks and rotor blades by means of forced recirculation of the coolant liquid actuated as a result of relative motion of the stator with regard to the rotor.

It is a still further object of the present invention to provide a liquid cooling system in gas turbines where the heat exchanger is incorporated either within a compressor drum or, as part of the last stages of the compressor unit, or after the compressor, and where the liquid returning from the disks and blades of the turbine is cooled before returning to the liquid tank, either by circulation through the ducts within the body of the heat exchanger, or through the blades of the heat exchanger, or as a further option, passing through blades of the compressor section.

In accordance with the teachings of the present invention, a liquid cooling system is incorporated in the turbine rotor of a gas turbine and includes a tank containing a cooling liquid and a coolant pump coupled to the tank to extract the cooling liquid therefrom and to forcefully recirculate the cooling liquid through the rotor shaft, rotor disks, and rotor blades. The cooling system of the present invention further includes a heat exchanger and a system of channels (intake and output) extending within the rotor shaft, rotor disks, and blades. The inlet of the heat exchanger is coupled to the output channels to receive a heated cooling liquid therefrom, and the outlet of the heat exchanger is coupled to the inlet of the tank to deliver the cooled liquid thereto. The coolant pump of the liquid cooling system is actuated as a result of relative motion of the stator with regard to the rotor of the turbine.

There are several additional embodiments of the present invention with regard to the design of the heat exchanger, in addition to the positioning of the heat exchanger within the system. The heat exchanger may be positioned inside compressor drum. Also, the heat exchanger may be incorporated into the compressor stage or after said stage, where the heat exchanger would include cooling blades having ducts formed therethrough and coupled to the output channels, in order that the heated liquid delivered from the rotor blades and rotor disks to the cooling blades' ducts transfers the heat associated therewith to the cooling blades of the heat exchanger. When the heat exchanger is incorporated into the compressor, the compressor's blades are also used for cooling purposes.

Preferably, the cooling blades of the heat exchanger are formed of heat resistant steel or super alloy (for the embodiment of the heat exchanger positioned at the end of the compression section), while the heat exchanger positioned within the compressor drum may be formed as a casting made from either a heat resistant steel, super alloy, or titanium alloy.

The cooling pump is a pump for forced recirculation of the coolant liquid through the system, which includes a rotating pump body and an adjusting unit coupled to the rotating pump body for adjusting the speed of the cooling pump.

The tank is a rotating tank, adapted for containing a coolant liquid such as a metallic alloy, which would preferably be a composition of 25% of sodium and 75% of potassium.

These and other features and advantages of the subject invention will be more fully understood from the following detailed description of the accompanying Drawings.

BRIEF DESCRIPTION OF THE DRAWINGS

FIG. 3A is a schematic representation of the turbine with the cooling system of type A of the present invention positioned within the compressor drum;

FIG. 3B shows the cross-section of the turbine of FIG. 3A, taken along section lines 3B—3B;

FIG. 3C shows the cross-section of the turbine of FIG. 3A, taken along section lines 3C—3C (specifically, FIG. 3C shows the turbine shaft with ducts formed therein);

FIGS. 6A and 6B show a longitudinal section and a side view of the heat exchanger of the alternative embodiment (type B) of the present invention;

FIGS. 11A–11G show schematically the types of actuating pump used in the cooling system of the present invention (FIGS. 11A–11C show the gear pump, FIGS. 11D–11E show the pump with rotating pistons, and FIGS. 11E–11G show the centrifugal pump);

DESCRIPTION OF THE PREFERRED EMBODIMENTS

The principles of the liquid cooling system of the present invention are based on an understanding of relativity theory, where two bodies having relative speed, one with respect to another, can always provide mechanical work. Therefore, a system linked to the engine rotor, could extract energy from the stator and for this reason, actuate the pump of the system of cooling with liquid. In an imaginary frame linked to the moving rotor, bodies obey all physical laws associated with motion and gravitational fields. The particular properties of this system are due to the inertia associated with rotation. The basic principles of general relativity have been understood and applied for a complete understanding of the liquid cooling system of the present invention. After adopting a rotating frame of reference, the principles of design of the system for cooling of turbines may be tailored to any type of gas turbine. For the sake of clarity, the further description will focus on a simple, but typical type, of turbo shaft engine with a single rotor, although the principles of the present invention may be applied to other types of gas turbines as well. The turbo shaft engine with a single rotor has many applications for both aerospace and power generations. In the present application, systems of cooling with liquid that rely on relative motion of the rotor with respect to the stator will be further referred as relative cooling systems.

Figure 1A:
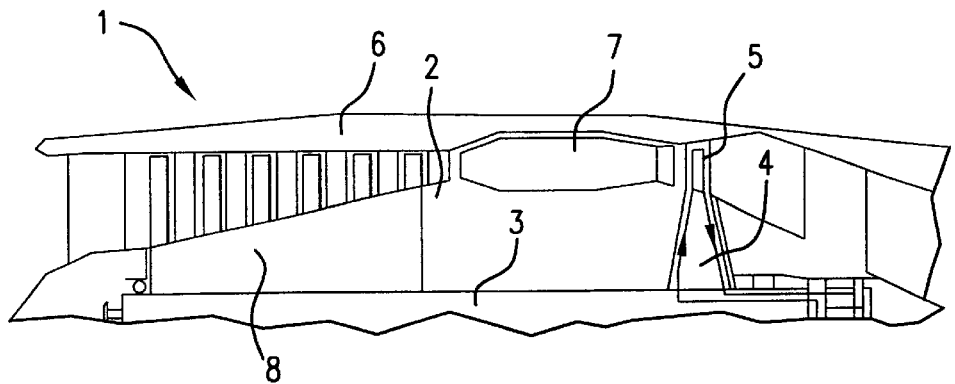
FIGS. 1A and 1B are schematic representations of liquid cooling systems for turbine disks and blades of the prior art.
Figure 1B:
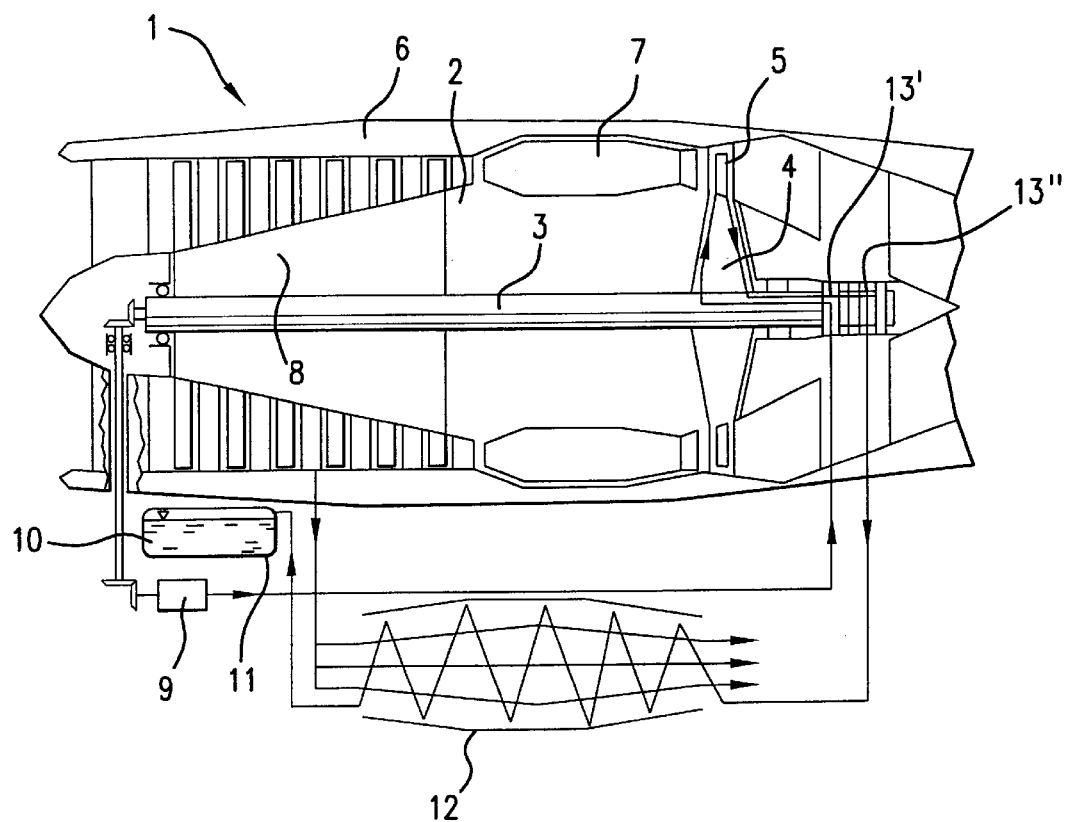
Figure 2:
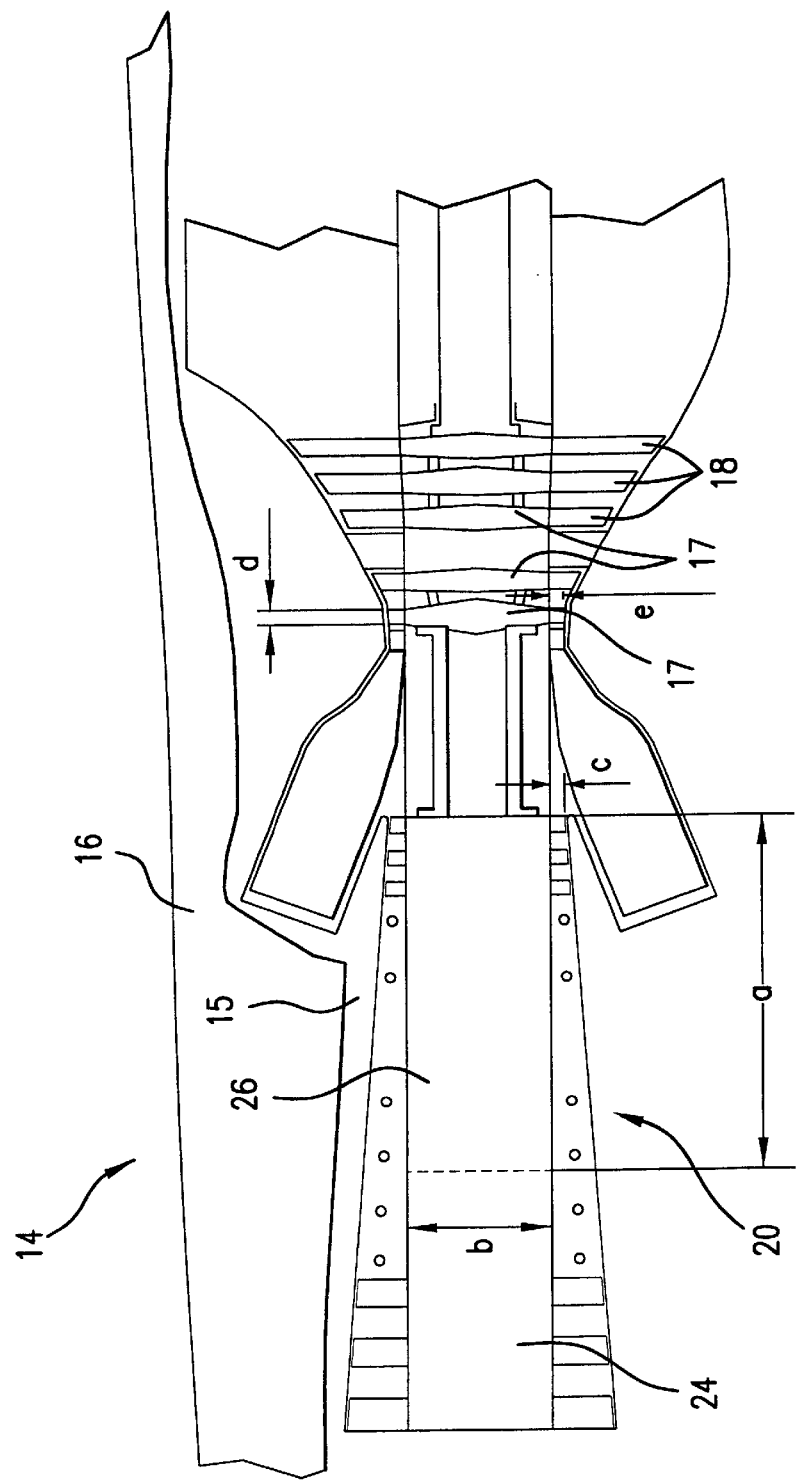
FIG. 2 is a schematic representation of a turbine showing a space formed within the rotor for accommodation of the cooling system of the present invention.

Referring to FIGS. 2–9B, there is shown a gas turbine 14 includes a rotor 15, a stator 16, rotor disks 17 with blades 18 thereon, a compressor section 20, and combustion section 22. As best shown in FIG. 2, in the combustion section, tank and heat exchanger spaces 24 and 26 respectively are provided within the turbine rotor 15.

Cooling system 28 of the present invention, as shown in FIGS. 3A–9B, is incorporated into the rotor 15 of the turbine 14. The elements required for the relative cooling system 28 include a liquid pump 30, an actuating swivel 32 to power the pump 30, a supply of compressed air covering a large pressure, a rotating coolant tank 34 having a "natural hydrostatic pressure" therein, and a heat exchanger 36. Hydrostatic pressure is needed to assure the continuous feeding of the pump and the heat exchanger cools the liquid with air. The components are housed within the rotor 15 with the tank 34 within the space 24, and the heat exchanger 36 is located within the space 26, as shown in FIG. 2. With the cooling system 28 encapsulated within the rotor 15, the difficult problem of the prior art of sealing the stator/rotor interface at a very high pressure and speed is circumvented.

There are several embodiments of relative cooling system of the present invention, with regard to positioning of the heat exchanger and the design of the heat exchanger itself, as will be described in the following paragraphs.

Referring to FIGS. 3A–3C and 4A–4D, the heat exchanger of a first embodiment is located within the internal space 26 of the compressor drum 38 or alternatively in the space between compressor disks.

In this embodiment, coolant pump 30 is actuated by the relative motion of the rotor with respect to stator and extracts cold or low temperature liquid (shown by the arrow 40) through a duct 42 (shown in FIGS. 3A and 3B) and a hole 44 drilled in a transfer bolt 46 of the rotor. The engine stator 16, which displaces with respect to the rotor 15, provides mechanical energy for pumping through a fixed swivel 48, floating hub 50, and the pump swivel (actuating swivel) 32 directly connected to the rotating body of the liquid pump 30. The liquid is pumped into the turbine rotor through holes 52 and 54, which are drilled respectively in the transfer bolt 46, and the turbine shaft 56 (shown in FIGS. 3A and 3C). Through ducts 58 and 60, liquid enters the turbine rotors of stage 1 and 2 (shown in FIG. 3A), respectively and returns through other ducts, 62 and 64, and the holes 66, formed in a duct support 67. The heated liquid, depicted by the arrow 68, enters the heat exchanger 36 through the duct, 70, and after being cooled in the heat exchanger 36, exits therefrom through the duct 72 and enters the tank 34 through the same duct 72. The aforementioned cycle is continuously repeated. Heat exchanger 36 and the turbine rotors have circular manifolds at the inlet and the outlet, respectively, for uniform distribution and recovery of the liquid.

Referring to FIGS. 4A–4D, showing the heat exchanger of the first embodiment where the heat exchanger is installed into the compressor drum. As shown in FIG. 3A, the heat exchanger 36 is designed to efficiently cool the heated liquid that returns from the turbine and to resist inertia forces and liquid pressure associated with the cooling process. For a gas turbine of medium power, with the dimensions as specified in FIG. 2, wherein "a" is 500 mm (19.685 inches), "b" is 200 mm (7.874 inches), "c" is 20 mm (0.787 inches), "d" is 25 mm (0.98 inches), and e is 200 mm (0.787 inches), the fifty turbine blades of stage 1 have a total external surface (including the over disk platforms) of about 0.0896 m². The heat exchanger is a casting formed of heat resistant steel, super alloy, or titanium alloy with brazed cylindrical ribs 74 extending over the blades 76, shown in FIGS. 4A–4D.

The heated liquid is charged through symmetrical holes 78 and enters the circular manifold 80, passes axially through the hollow blades 76 (30 blades) of the heat exchanger 36, and after cooling, enters the circular manifold 82, and leaves from the heat exchanger through symmetrical holes 84, which coincide with the holes 72, shown in FIG. 3A.

The external surface is increased by cylindrical ribs 74 (26 ribs), and radial ribs 86 (30 ribs). The radial ribs 86 strengthen the cylindrical ribs 74. The approximate dimensions of the heat exchanger design shown in FIGS. 4A–4D, include: the length "f" of the heat exchanger being 500 mm (19.68 inches), the diameter "g" of the heat exchanger body approximating 166.7 mm (6.56 inches), the length "h" of the hollow blade 76 is 29 mm (1.142 inches), the thickness "i" of the blade wall is 1.5 mm (0.059 inches), the width "j" of the slot made in the blade 76 is 3 mm (0.118 inches), the distance "k" between cylindrical ribs 74 is 1.2 mm (0.047 inches), the radius "l" of the first cylindrical rib 74 is 52.2 mm (2.07 inches), the radius "n" of a third rib 74 is 57.3 mm (2.26 inches), the diameter "m" of the manifold 80 is 102.8 mm (4.74 inches), the width "o" of cylindrical ribs 74 is 0.2 mm (0.00787 inches), and the width "p" of each blade 76 is 6 mm (0.24 inches). It is to be understood that the dimensions of the heat exchanger 36 of the present invention are given as an example and not for limiting the scope of protection of the present invention, since other dimensions are also contemplated in this invention. With the dimensions as shown, the heat exchanger 36, shown in FIGS. 4A–4D, has an external surface (used for transfer of heat to compressor air) of about 12.47 m².

Therefore, the ratio between the thermal transfer surface of the heat exchanger and that of the rotor blades is about 135. As a consequence, the heat "absorbed" by turbine blades from burnt gases is more easily transferred to cooling air. The hot air from the heat exchanger of the first embodiment, may be sent through holes drilled through engine components to one of the last stages of the turbine as shown by the arrow 88 of FIG. 3A. An alternative solution is to reinject this air into the compressor flow, at a stage which is chosen based on the residual pressure of cooling air.

For the first embodiment heat exchanger, i.e., type A shown in FIGS. 3A–4D, the air cooling surface is large compared to that of a thermosyphon system of cooling. This design places the heat exchanger within a large space 26 (shown in FIG. 2) where the heat transfer area may be greatly increased and used as forced circulation of a thermal agent instead of relying on density differences typical for the art.

Figure 4A:
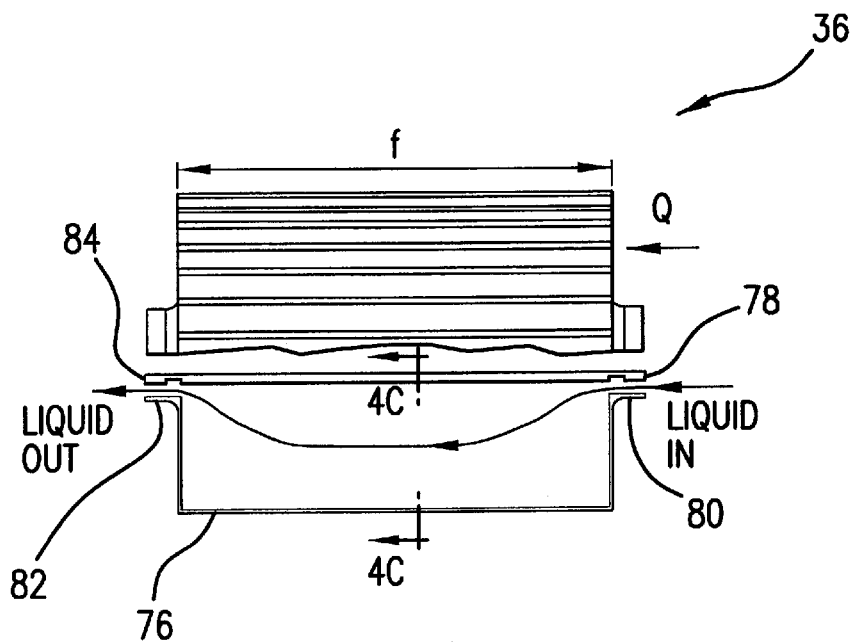
FIG. 4A is a partially sectioned front view of the heat exchanger of type A of the present invention.
Figure 4B:
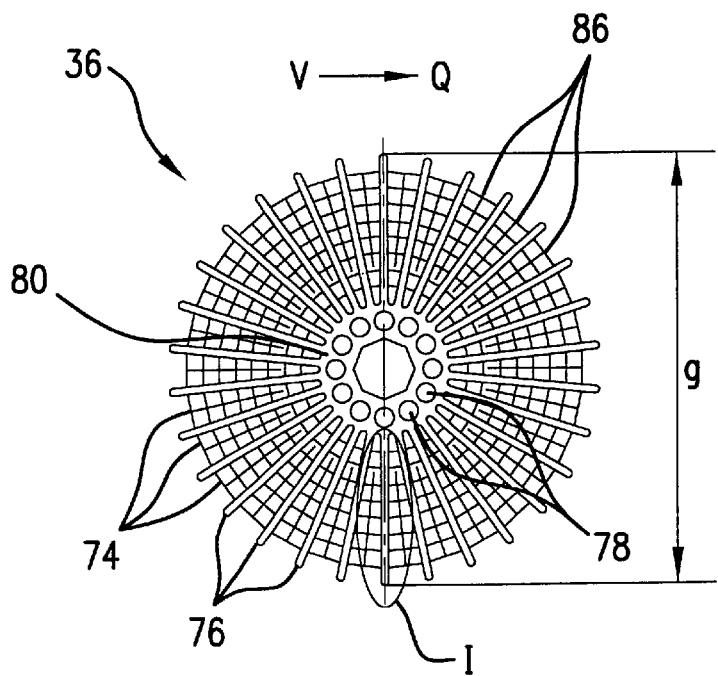
FIG. 4B is a side view of the heat exchanger.
Figure 4C:
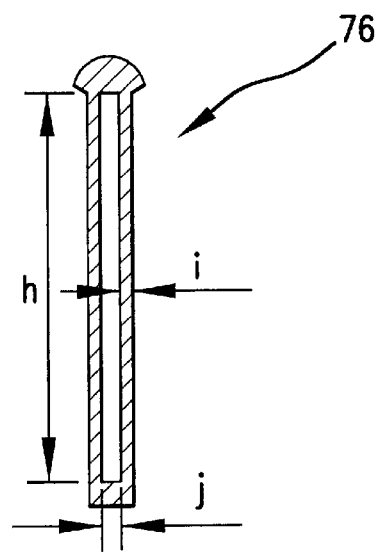
FIG. 4C is a cross-section of the blade of the heat exchanger of type A, shown in FIG. 4A, taken along the section lines 4C—4C thereof.
Figure 4D:
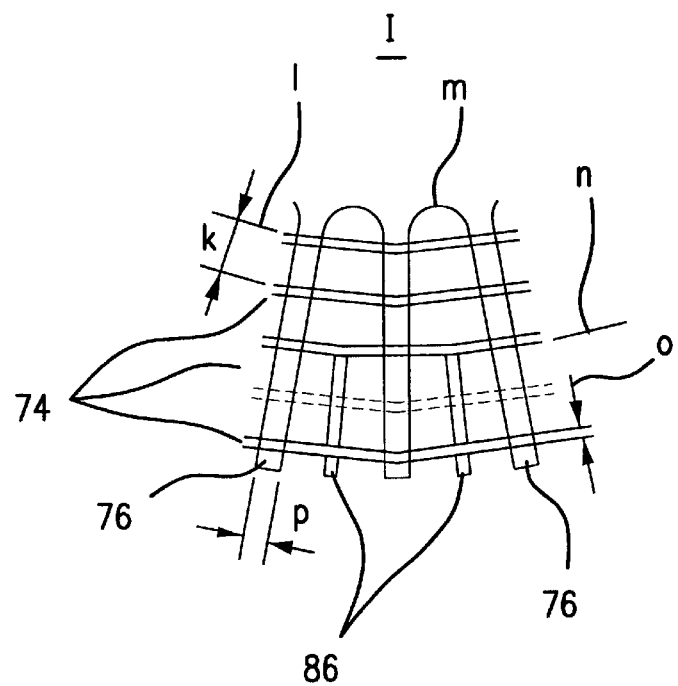
FIG. 4D shows an enlarged view of the segment I of FIG. 4B.

The above discussed ratios of heat transfer areas may be increased by manufacturing the heat exchanger using advanced technologies, for example, the replacement of circular and radial ribs 74 and 86, shown in FIGS. 4A, 4B, and 4D with spongy metal having open and large pores, generally yields a highly increased external area for heat exchange.

Figure 5:
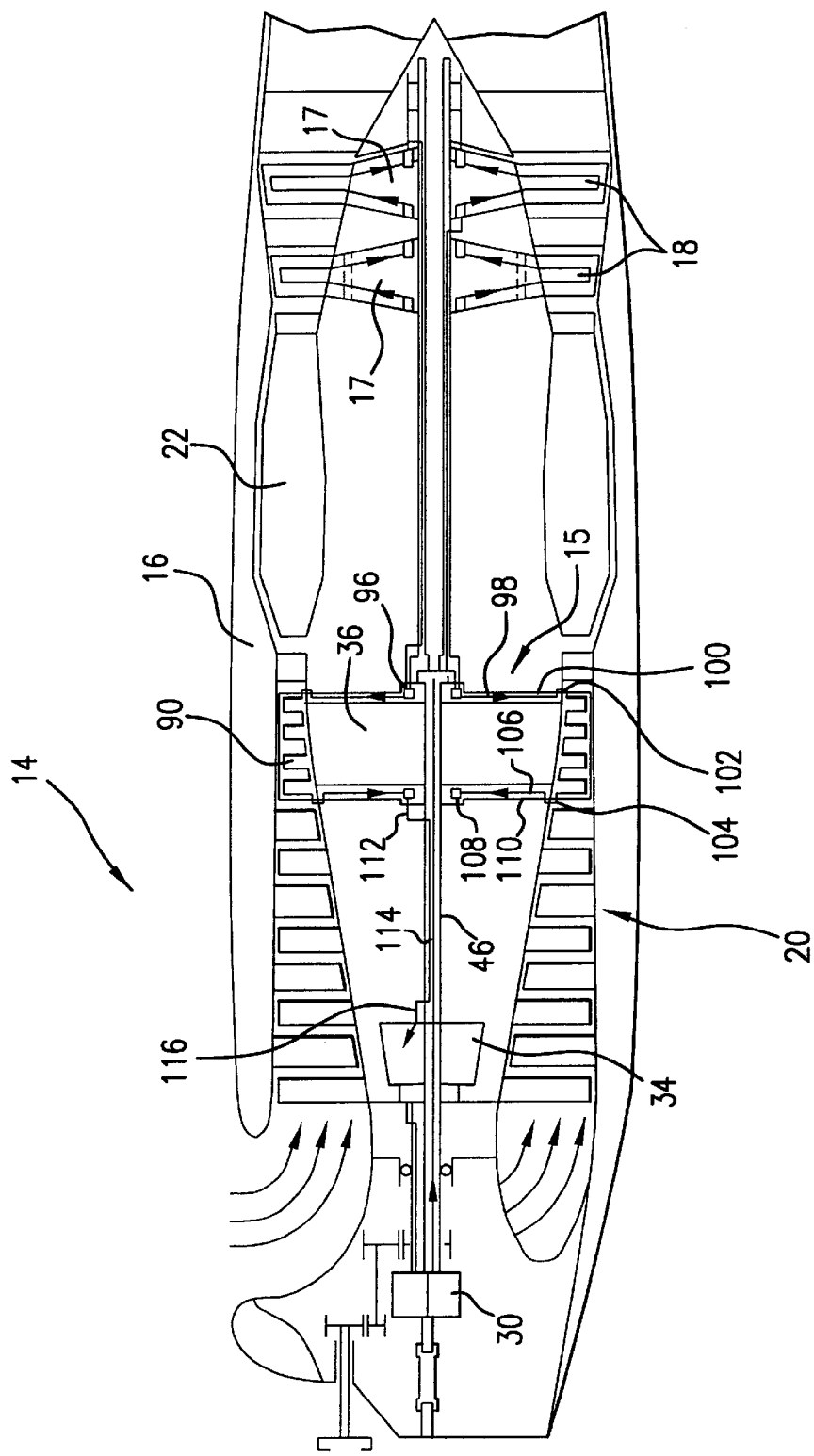
FIG. 5 is a schematic representation of an alternative embodiment of the cooling system (type B) of the present invention.
Figure 7:
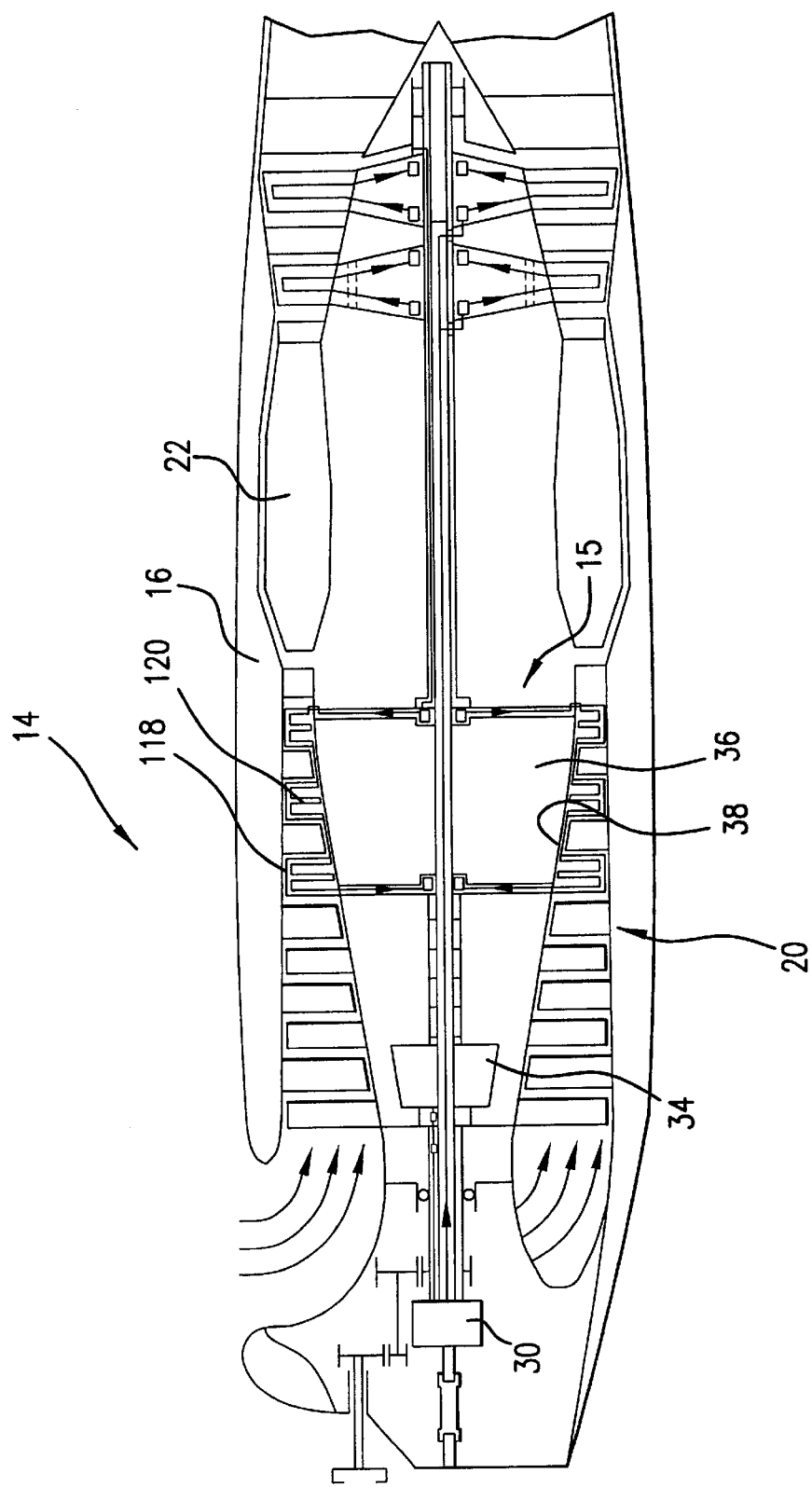
FIG. 7 shows schematically a third alternative embodiment of the cooling system (type C) of the present invention.
Figure 8B:
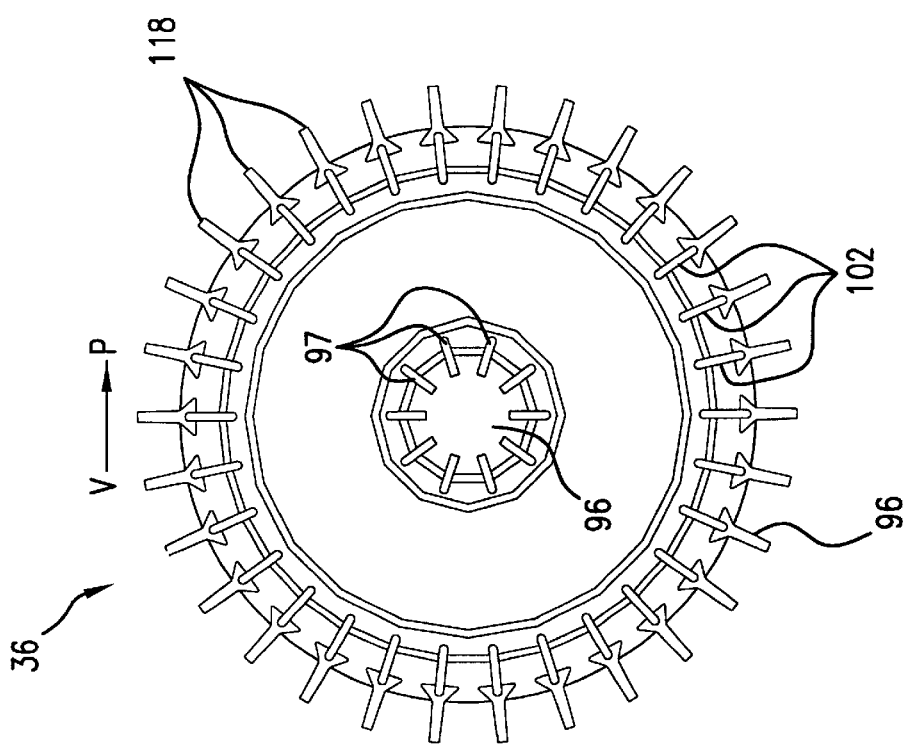
FIGS. 8A and 8B show, respectively; a longitudinal section and a side view of the heat exchanger (type C) shown in FIG. 7.
Figure 8A:
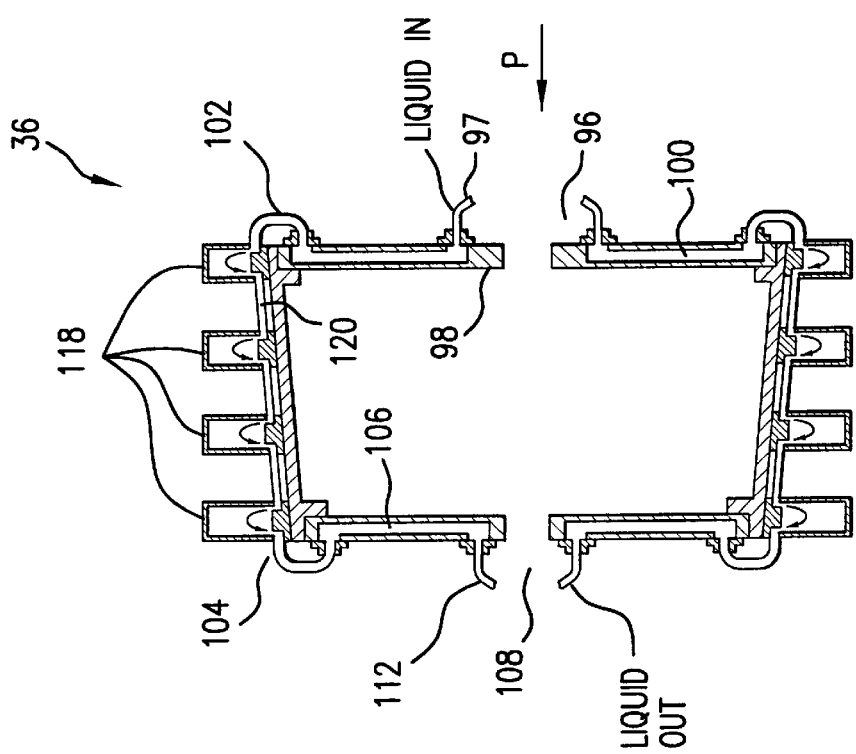

Alternative relative cooling system of type B is shown in FIG. 5, wherein the compressor 20 incorporates the heat exchanger 36 at a last stage thereof. This stage of the compressor has special blades 90, shown in FIGS. 6A and 6B, that are symmetrical in shape and have an elongated chord 92 and ducts 94 for coolant. The heat is transferred from the cooling liquid to the blades 90 and then to the compressor air flow. The heated liquid coming from the turbine and entering the circular inlet manifold 96 through inlets 97, passes through the inlet diaphragm 98 and radial holes 100 and enters into the blade 90 through the inlet duct 102. Cold liquid leaving the blades 90 through exit ducts 104 and radial holes 106 enters the exit manifold 108 of a diaphragm 110. The cooled liquid enters the hole 114 of the transfer bolt 46 through a duct 112 and exits through a duct 116 to finally arrive at the tank 34.

Being symmetrical in shape and having a null incidence angle, the blades 90 of the heat exchanger of the second embodiment, shown in FIGS. 5 and 6A–6B leave air pressure unchanged. The heat exchanger of the second embodiment provides for efficient heat transfer when all heat absorbed by coolant is transferred to the compressor air flow at the compressor exit. In this manner, most of the heat is recovered. The amount of recovered heat is generally small compared to the heat released within the combustor. As a consequence, the design of combustors requires few modifications as will be presented in the following paragraphs.

In the heat exchanger of the second embodiment, the number of blades 90 is based on a compromise between the amount of heat that must be transferred to the air flow and the need to reduce aerodynamic loss. In manufacture, the blades of the heat exchanger may be formed of heat resistant steel or high temperature alloys.

The optimum compressor ratio and therefore the air temperature at the compressor exit increases with the temperature at turbine inlet. Consequently, the heat exchanger transfers less heat. The length of the heat exchanger may become excessive and/or the liquid coolant may remain too hot and contain an inadmissible quantity of solved vapors since too little heat is transferred to the air resulting in poor operation of the pump. For this reason, the second embodiment of the heat exchanger may be combined with one of the heat exchangers of either the first or third embodiment, i.e., type C, shown in FIGS. 7 and 8A–8B. In the third embodiment of the heat exchanger, the blades 118 of the compressor stage have a dual function, i.e., air compression and heat exchange. Blades 118 are similar to turbine blades, except for a reverse heat flow, i.e., the heat flow from metal to the air. The cooling circuit is similar to the circuit shown in FIGS. 6A–6B, except for ducts 120 which are added to transfer the liquid from one compressor stage to another. Depending on the engine design, several combinations are possible.

Figure 9:
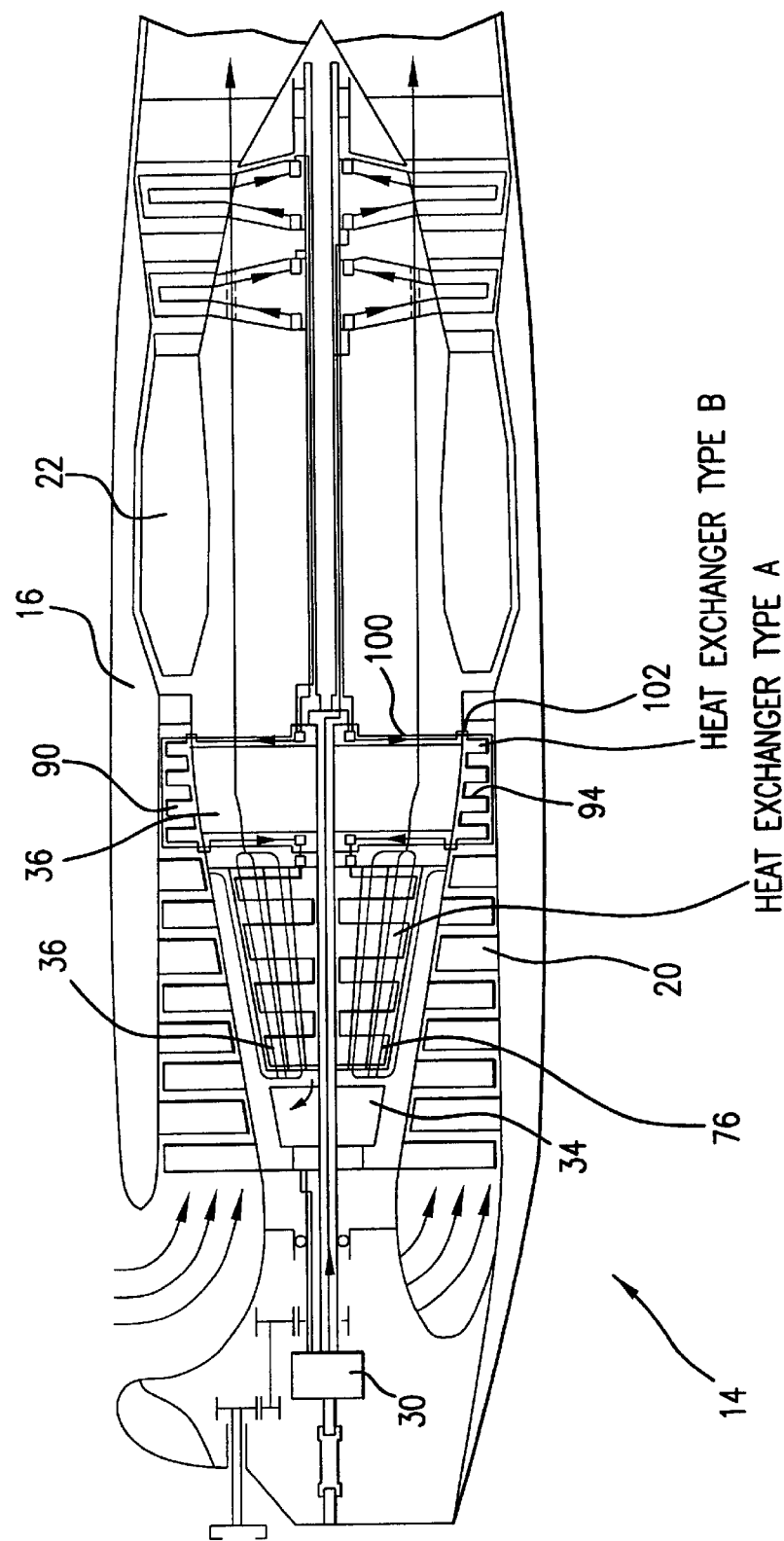
FIG. 9 is a schematic representation of a hybrid cooling system of the present invention.
Figure 10A:
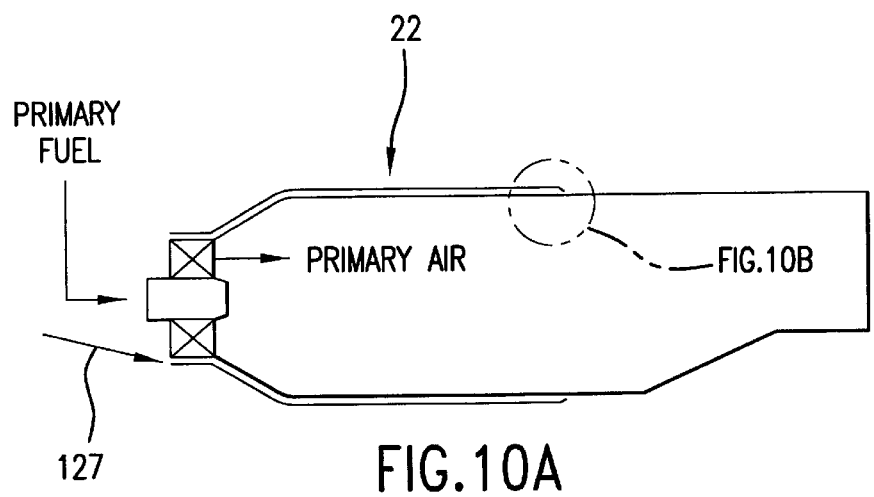
FIGS. 10A and 10B show combustor cooling principles of the present invention with FIG. 10B being an enlarged view of a section of FIG. 10A.
Figure 10B:
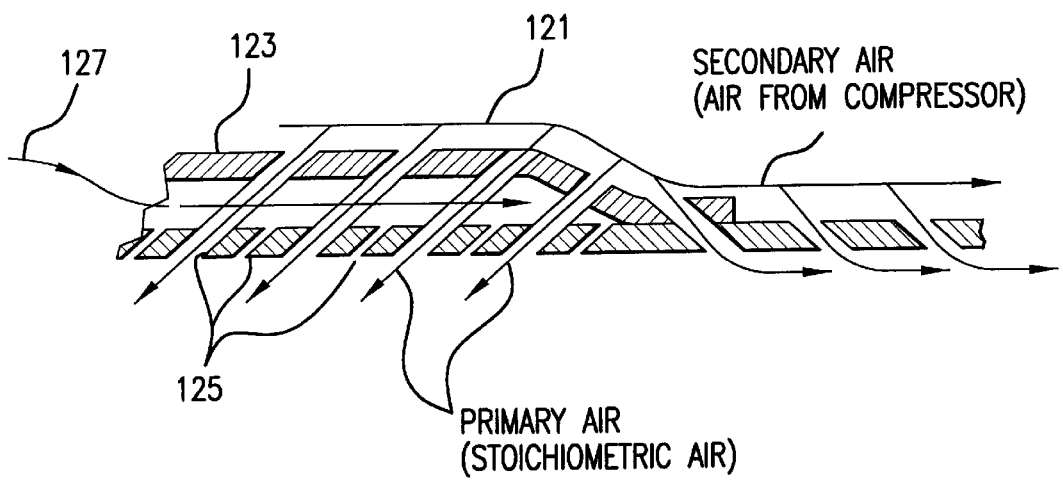

The turbine blades may be formed from nickel or cobalt super alloys, while the blades of the heat exchanger can be formed of a high temperature alloy or heat resistant steel. The shape of the heat exchanger blades 118 also differ from that of turbine blades. Steel is used for the last compressor stages, since the temperature of highly compressed air may exceed 700 K. If the third embodiment heat exchanger is used, the compressor blades that transfer heat must have a relative thickness exceeding those of normal compressor blades. In the third embodiment, engine cycle is the same as for the first and second embodiments. This design provides a large heat transfer area and additionally, the compressor flow has a wide range of air temperature. The thermal efficiency of an engine with a heat exchanger of the third embodiment is normally between those of engines with heat exchangers of the first and second embodiments, since no air is extracted from and re-injected into the compressor flow, but on the other hand, heating of compressor flow increases compressor work. The design of this type of heat exchanger must balance efficiency of heat transfer and cost. It can be used alone or in combination with a heat exchanger of the first or second embodiments, as shown in FIG. 9 where a hybrid system of cooling combines the first and second embodiments of the heat exchanger.

Liquid and air cooling systems are not mutually exclusive. Assuming a temperature of 2250 K at turbine inlet, the first two rotor stages of the turbine must be cooled with liquid. These stages provide an enthalpy drop of about 500 KJ/KG (i.e., lower the gas temperature below 1750 K) and, therefore, the other rotor stages may be conventionally cooled with cold air. Theoretically, engines with relative cooling systems that use conventional fuels may exceed the thermal efficiency of current designs by 8 percent. Alternate fuels, such as hydrogen, may provide additional gains of 2% or 3%.

In the second embodiment heat exchanger, the amount of recovered heat is small compared to the heat released within the combustor. Due to this, the combustors may require some design modifications. As the temperature at the turbine inlet increases, less excess air is needed. The combustor 22 must be lined with a film 121 of air as shown in FIGS.

10A–10B. Cooling the combustor becomes more difficult as radiation increases with temperature and the percent of excess air decreases. The combustor design may combine a wall 123 with fine holes 125, control of the cooling film, and cooling with liquid fuel 127 for elevated temperature areas.

Referring to FIGS. 11A–11G, several types of hydraulic pumps including a gear pump (FIGS. 11A–11C), pumps with rotating pistons (FIGS. 11D–11E), and centrifugal pumps (FIGS. 11F–11G), are suitable for the relative cooling system of the present invention. Each such pump includes a pump body 122, a fixed swivel 124, a floating hub 126 (for the gear pump and centrifugal pump) and a hub with an oblique plate 128 (for the pump with rotating pistons).

Figure 11F:
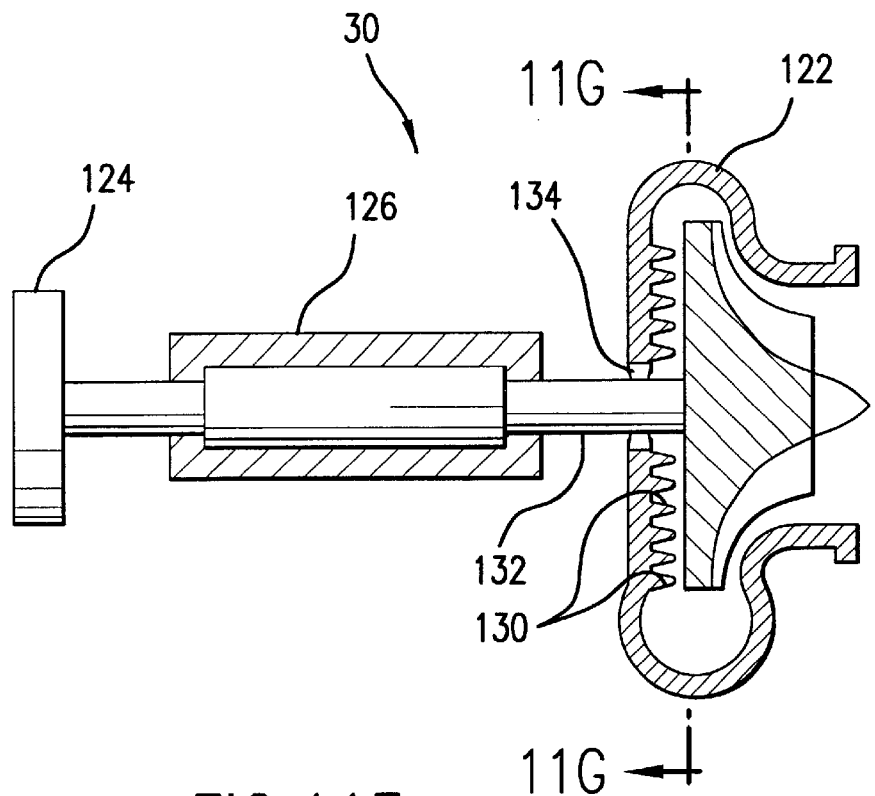
Figure 11G:
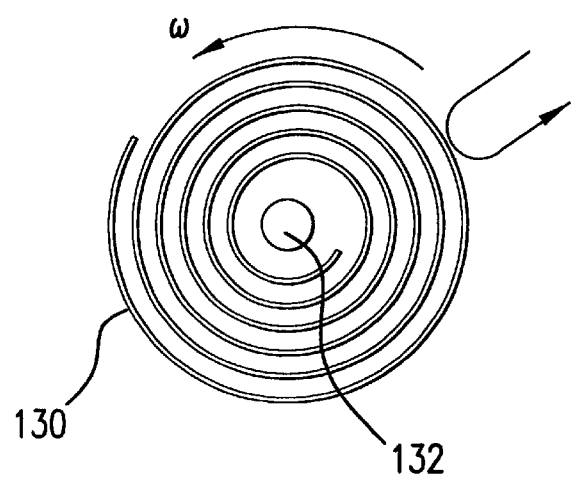

Inertial forces applied to the rotating body of the pump, reduces the amount of liquid that leaks through the pump axis. These forces tend to force the liquid away from the axis of the rotation, as shown in FIG. 11G (this process is enhanced by the rib 130 of the pump body). In this case, the spindle 132 has an increased seal over that of a static pump. The seal 134 of the pump spindle 132 is included in order to prevent coolant leakage after the engine stops.

The flow of circulating liquid is implicitly controlled. Engine acceleration increases the fuel flow and consequently the temperature at turbine inlet and the rotor speed increase. The total heat flux from burnt gases to turbine blades increases, since both convection and radiation flux increase. Being proportional to the rotor speed, the pump flow increases. For both the heat exchanger and turbine blades, the coefficient of thermal transfer due to convection is proportional to the rate of liquid flow. In this manner, more heat is transferred from the turbine rotor to the air that passes through the heat exchanger.

The pump with rotating pistons (FIGS. 11D–11E) or the gear pump (FIGS. 11A–11C) generally have a small diameter and a central location. Nevertheless, inertia forces are high enough to warrant a careful wear analysis. As seen from FIG. 11B, the inertia force, Fi, acting on gear 152 and the local radial force due to gearing, Fr, are additive causing increased friction on sleeve 154. The inertia force of piston 156 (FIG. 11E) causes a mechanical pressure on cylinder 158. The end result is increased wear due to the relative motion between these parts (relative rotation between gear 152 and sleeve 154 and translation between piston 156 and cylinder 158). The gear design minimizes the mass of moving parts in order to responsively minimize wear. Titanium may be used for gear 152. As shown in FIG. 11C, oxygen thermo-diffusion may be used to improve wear resistance on the working surface, W*. The swivels 160 of the pump gears may be supported by roll bearings 162 (with rolls having a relatively small diameter). An empty space S is added using a sleazy cover 164.

Titanium may be used for piston and the conjugate cylinder of piston pumps. Oxygen treatment increases the wear resistance of surface U*, as shown in FIG. 11E. An important problem is the capacity of pumps 30 to work at high temperatures (200–400° C.) because the necessary airflow for liquid cooling is reduced. For this reason, the pump components are formed of materials with the same coefficient of thermal expansion. Obviously, wear problems appear in the case of aeroengines where angular speeds of rotors are usually high. In the case of industrial engines (for electrical power generation) the angular speeds are low (several thousands of rpm) and the inertia forces are consequently low.

Figure 12:
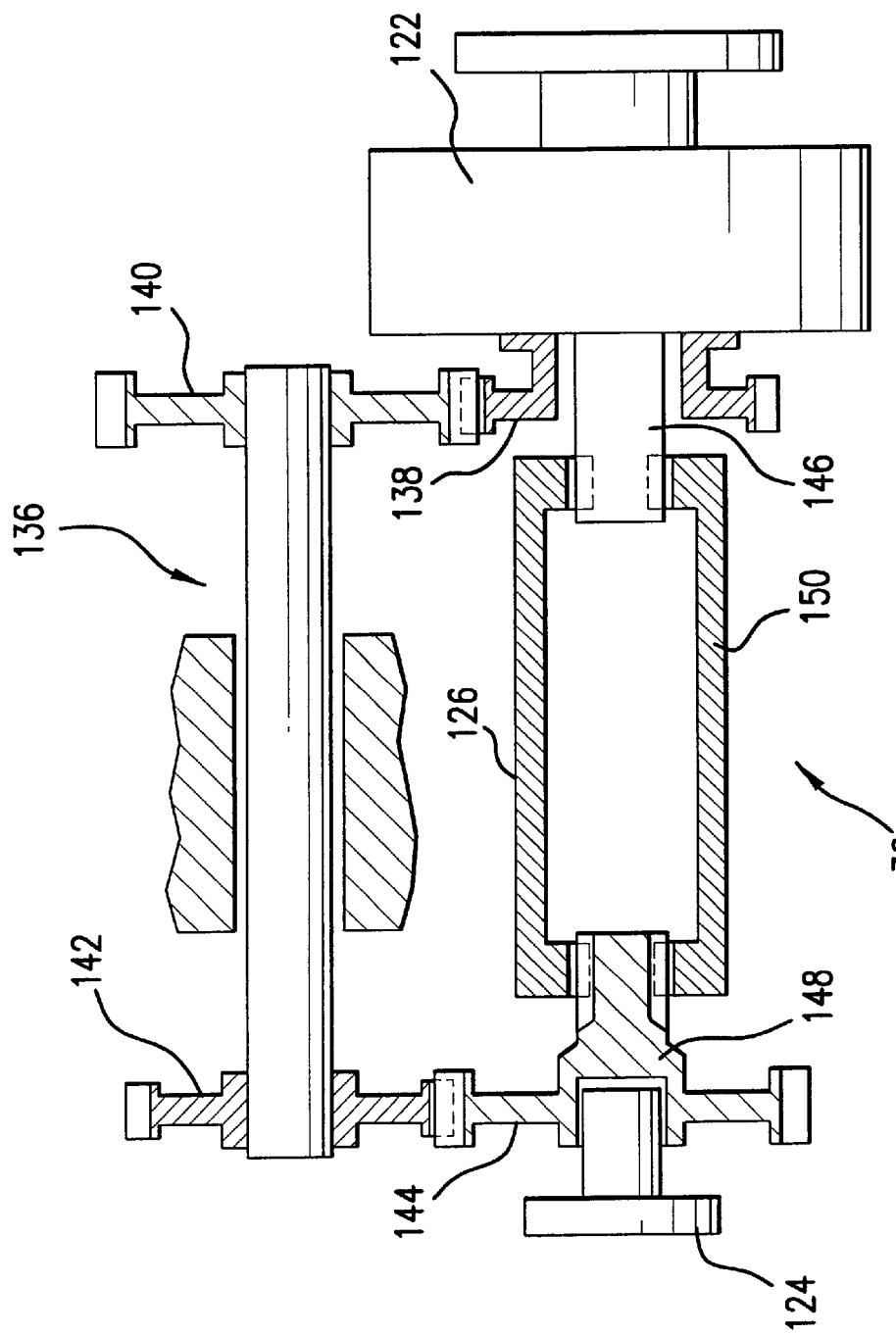
FIG. 12 is a schematic representation of a control arrangement for relative speed control of pump spindle in the cooling system of the present invention.

Technical problems, such as cavitation and hydraulic losses, limit the speed of hydraulic pumps. Pumps with rotating pistons, centrifugal pumps and gear pumps are limited to less than 1000, 3000, and 5000 rpm, respectively; while the engine rotor may reach 30000 rpm. Nevertheless, the design of an actuating swivel for a pump is feasible and includes a simple gear mechanism 136 shown in FIG. 12. The gear mechanism 136 includes gears 138–144 and adjusts the relative speed between the mortised pump swivel 146 of the pump, and the mortised swivel 146 of the gear 144. The mortised hub 150 transmits the power from gear 142 to pump swivel 146. Consider a gear pump and an engine rotor having maximum speeds of $n_2=4000$ and $n=16000$ rpm, respectively. The necessary transmission ratios are $Z_1/Z_2=0.87097$ and $Z_3/Z_4=0.87097$, where $Z_1$ is the number of teeth of the $i^{th}$ gear. Thus, the speed of pump swivel 146 relative to pump body 122 is 3863 rpm <4000 rpm.

Figure 13:
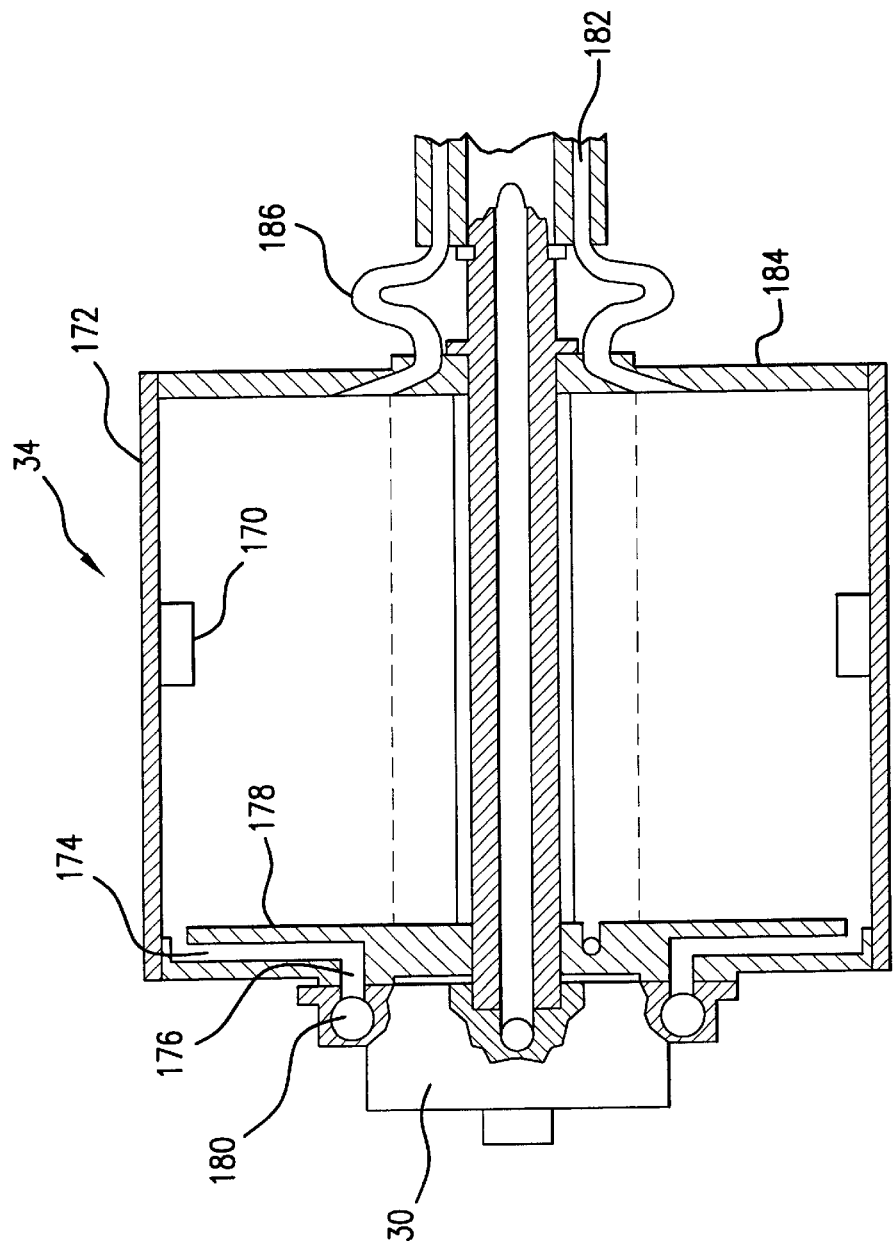
FIG. 13 shows a longitudinal section of a rotating tank for coolant liquid of the present invention.

Referring to FIG. 13, the rotating tank 34 is subject to the inertia of the engine rotor. In the rotating tank, there is an inertia "hydrostatic" pressure which is similar to a gravitational hydrostatic pressure. When the engine starts, the radial plates 170 assure the immediate liquid rotation. The liquid is forced by the inertial forces to the external wall 172 of the tank 34, creating a "hydrostatic" pressure. Through the multiple holes 174 and 176 that are drilled in the front wall 178, the liquid flows to the inlets 180 (two inlets with symmetric positions) of the pump 30. Liquid returns from turbine through holes 182 in the engine shaft and enters the posterior wall 184, through ducts 186 (the above example is given for tanks that are not located within the compressor drum).

In some cases, the inlet diameter of the pump 30 may be smaller than the surface diameter of free liquid. In this instance, an "atmosphere" must be created within the tank either using low pressure air taken from one of the first compressor stages (the 2nd, 3rd, or 4th) or an inert gas if the coolant does not resist oxidation. Another rotating tank would host the inert gas.

The tank 34 performs two other important functions:
1. Facilitates in expansion of liquid that occurs when the engine operates at maximum power (therefore, the tank volume must be high enough to accept the expanded liquid (the tank temperature increases when the engine runs and therefore needs room to dilate freely along the axial and radial direction) and
2. Separation of gases (air, vapors) from liquid (i.e., acts as a centrifugal separator).

Figure 14A:
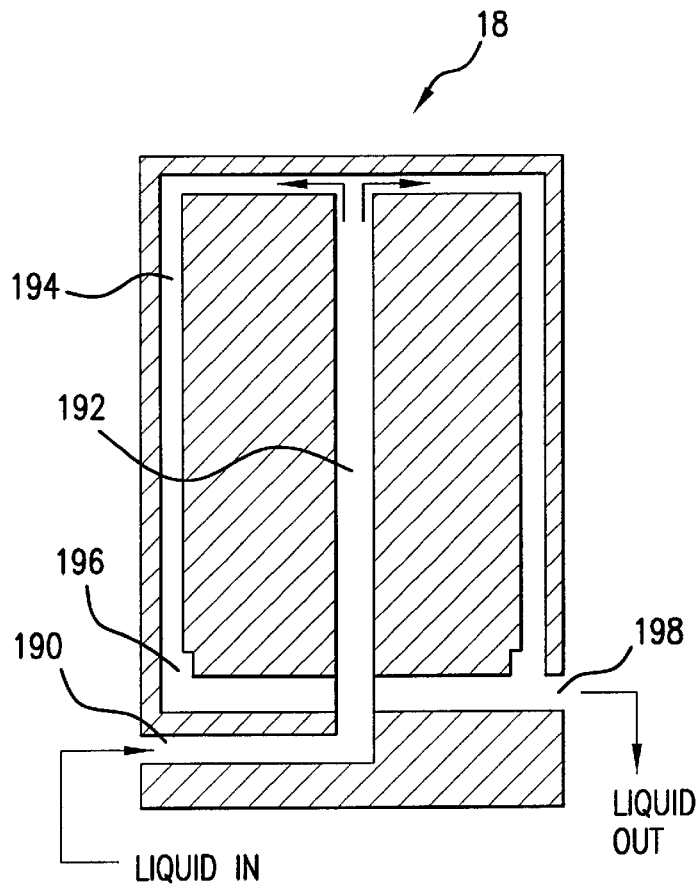
FIGS. 14A and 14B show, respectively, longitudinal and cross-sections of the cooling circuit within a turbine blade of the present invention.
Figure 14B:
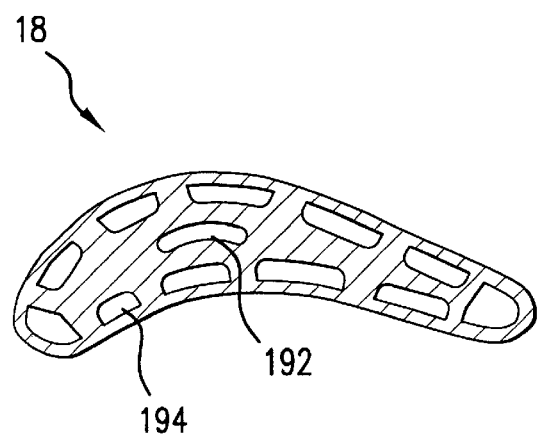

In the rotor blades 18, the most severe thermal stress occurs at the leading and trailing edges of the blades. Nevertheless, holes shown in FIGS. 14A and 14B having small diameters formed within the blades are generally sufficient to cool critical areas. As shown, low temperature liquid enters through a hole 190, passes through central hole 192 to cool the blade core. At the tip of the blade the liquid has higher temperature and reduced density. Circulating through the peripheral slots 194, the liquid cools the blade external wall and core, enters the peripheral manifold 196 and exits through the hole 198. Such a circulation scheme has two advantages:
1. The gradient of liquid density between hole 192 and slots 194 helps coolant circulation and reduces the power consumption of the pump; and,
2. The temperature distribution is more uniform across blade sections reducing thermal stress.

For gas temperatures of less than 2100 K, turbine blades may be formed of thermal super-alloys. However, for higher temperatures, composite materials with high strength and heat conductivity are required due to the increased thermal stress which is proportional to the heat flux from burnt gases.

It is to be understood that in this context, 'cold' and 'hot' are relative terms. For example, a 'cold' metallic coolant can have a temperature of 673 K at turbine blade inlet. The hot coolant might have 1073 K, while the blade metal may reach 1273 K.

Figure 16:
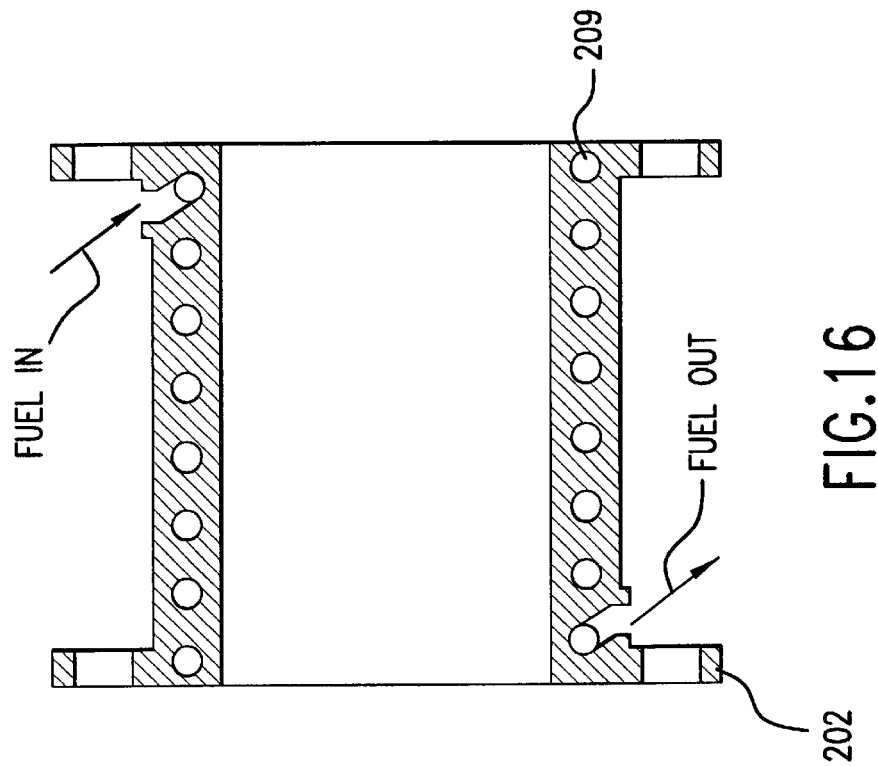
FIGS. 15 and 16 show, respectively, cooling of turbine vane and casing of the turbine.
Figure 15:
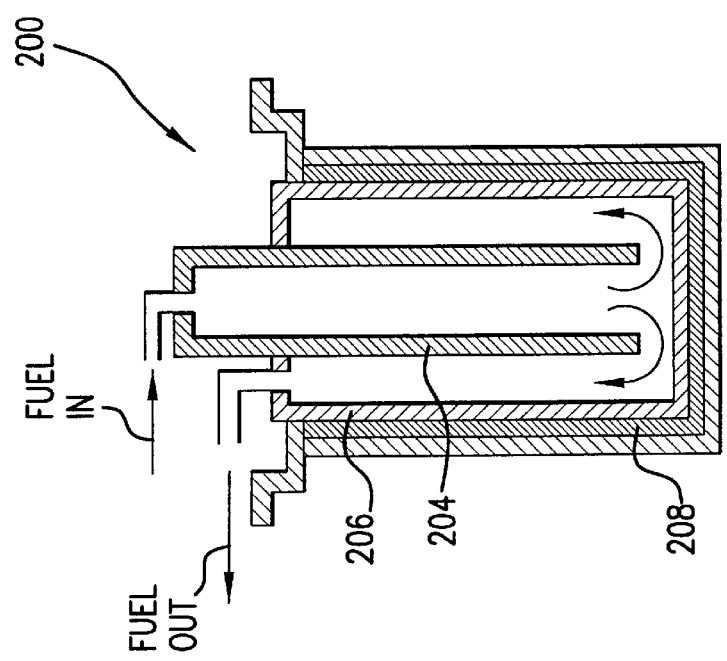

It may be useful to specify several design considerations for cooling systems of turbine vanes and casing. For a high $T_3^*$, the first turbine vanes 200 and casing 202 can no longer be cooled with air and thus liquid cooling is mandated, as shown in FIGS. 15, 16. The cooling system for the engine stator may be simply designed since all components can be placed on the stator. However, it is not necessary to use a closed loop water circuit as was previously used. Fuel flow is sufficient to absorb the heat that comes from turbine vanes and casing. The advantages of this design are the recovery of heat and increased combustion efficiency. For turbine vanes, the design is simpler. Internal fairing 204 and external fairing 206 may be welded to the vane body 202. A silver coating 208 is used to reveal cracks in the vane body and to assure a more uniform heat transmission from burnt gases to fuel.

Forming cooling holes 209 having complex configurations is the main challenge facing a relative cooling system. A solution is to first manufacture the cooling circuit from a tube having a wall thickness of 0.3 mm and an internal diameter of 1–3 mm then placing it within the casting model and finally pouring the molten metal. A calibrated air flow continuously blows through the tube to protect it from melting. In this fashion, the cooling circuit is integrally incorporated within the casing metal 202.

Figure 17A:
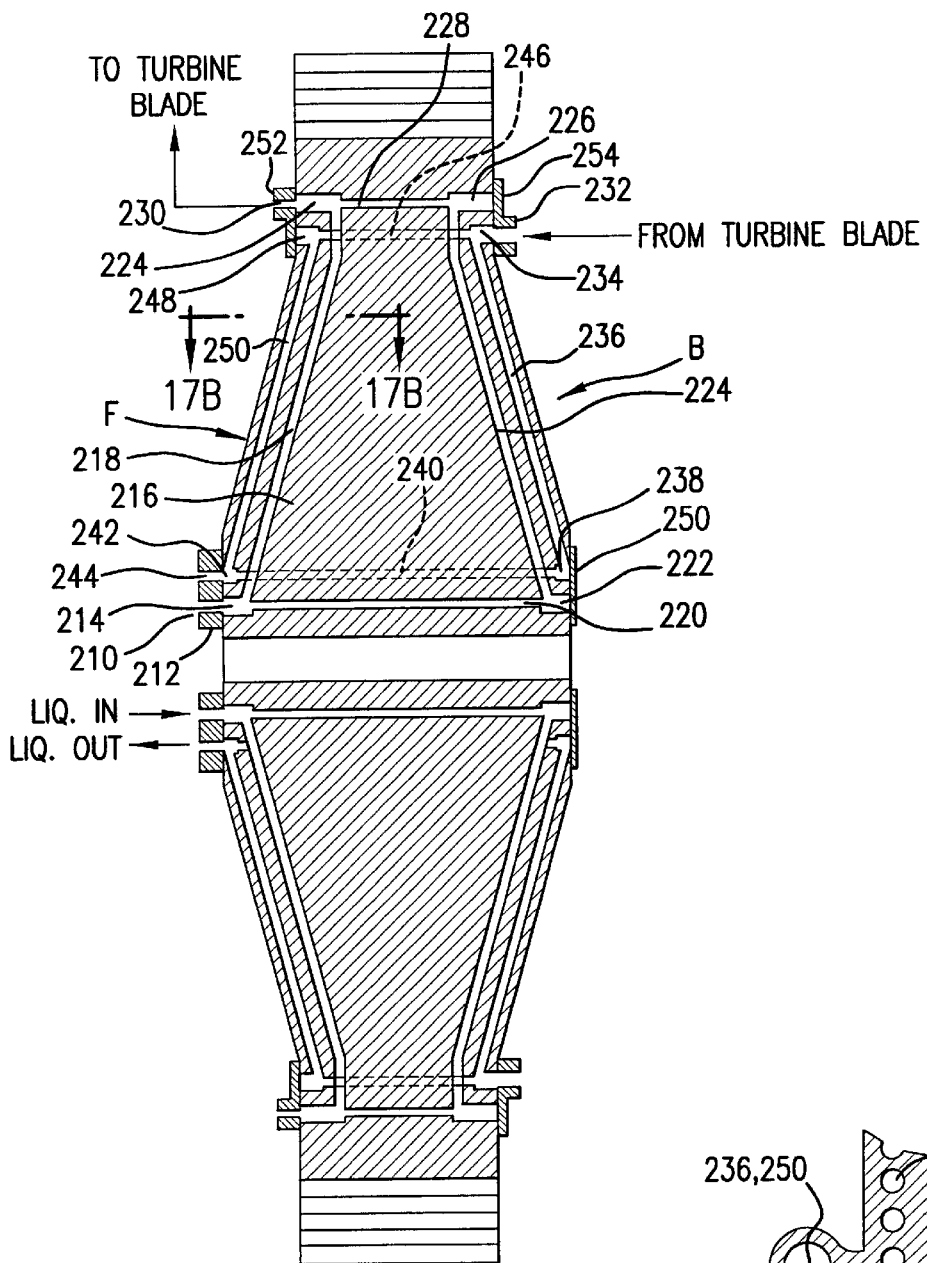
FIG. 17A shows a cooling circuit for turbine disk of the present invention.
Figure 17B:
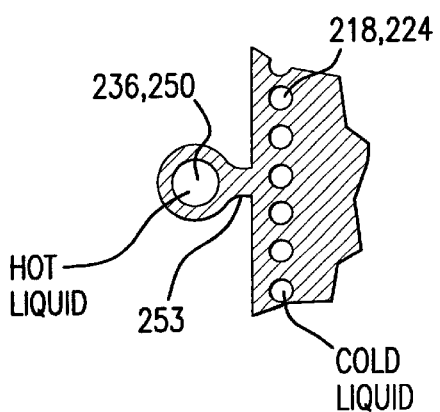
FIG. 17B is a section of the cooling circuit of FIG. 17A taken along lines Q—Q thereof.

Turbine discs receive the most heat from turbine blades. Heat is transferred by conduction from the blade root to the disc periphery and then to the center of the disc. Compared to the blades, discs receive little heat through radiation, since discs are sheltered from direct contact with hot gases and the coat of aluminum paint reflects incident radiation. Therefore, the geometry of a cooling circuit may be designed as shown in FIGS. 17A and 17B (holes have a radial orientation). The cold liquid enters through multiple symmetric holes 210 that are drilled into the plate 212, then passes into the circular manifold 214, located within disc 216. Some liquid flows to the disc periphery through a system of radial holes 218 and cools the disc face F. Liquid also flows through axial holes 220, circular manifold 222, and radial holes 224, cooling face B. At the disc periphery, liquid is collected within manifolds 224 and 226 (manifold 226 communicates with the manifold 224 through axial holes 228). Holes 230 provide the disc/blade interface (there is a hole 230 for each turbine blade). After cooling the blade, the liquid re-enters the disc through holes 232 (there is a 232 hole for each turbine blade), then enters the circular manifold 234. Through radial holes 236, a portion of the liquid passes to the circular manifold 238, passes through axial holes 240, enters the circular manifold 242 and exits through holes 244. The remainder of the hot liquid from the turbine blades passes through axial holes 246, circular manifold 248, radial holes 250, circular manifold 242, and exits through holes 244. The manifolds 214, 242, 222, 238, 248, 224, 226, 234 are occluded by plates 212, 250, 252, 254, respectively. Thermal stress is minimized by optimizing the number of holes 218, 224 as well as the geometry of the front and rear faces. The included sleazy neck 253 shown in FIG. 17B reduces the heat transfer between returning hot liquid and disc.

Ducts in the cooling system may be short and pose stress problems. Due to inertia forces, internal pressure and mechanical stress are higher than usual. Ducts are designed and made from high temperature super-alloys within turbine and from heat resistant steel within the compressor. Spherical joints are used for sealing.

The liquid used within the cooling system must have a series of special properties which are divided into chemical and physical properties.

Chemical properties:
Chemical stability at high temperature, i.e., the liquid must not decompose due to high temperature
Resistance to oxidation
Should not react with the materials of system components (such as ducts, blades and discs).

Physical properties:
Low viscosity
High boiling temperature
High latent heat of vaporization (in case vaporization is used)
Sufficient lubricating capacity Without these properties, the coolant would be unable to perform all required functions. The molecules of a coolant that tends to decompose would break down at high temperature yielding another substance with inappropriate properties. The resulting substance may leave sediments on the walls of ducts and holes that restrict the flow of the remaining coolant or might even cause the corking of the cooling circuit. Liquid oxidation or interaction with the materials of circuit components can lead to the same undesired effects. The pump requires less power if the coolant has low viscosity. A lubricant fluid assures the lubrication of pump bearings.

A high boiling point simplifies the system design since virtually only one phase (liquid) is present within the cooling circuit, however, such increases the power required for pumping. A large amount of heat is absorbed during vaporization of coolant within turbine blades if the latent heat of vaporization is high. As a consequence, satisfactory cooling may be assured with a reduced flow of liquid thereby lowering the power consumed by pump. The internal surface of the heat exchanger has to increase due to the presence of vapors, which being in gaseous state have a low coefficient of heat transfer by convection.

If vaporization is used during the blade cooling process, the heat transfer under boiling conditions and condensation processes is extremely complex. A comprehensive analysis of these phenomena combines a simplified theoretical model (based on the similitude between gravitational and inertia fields) with experimental work. For a reduced flow, the condensation of wet vapors within the heat exchanger is like natural non-forced condensation that occurs in unlimited space. In the gravitational field, this process depends normally on the Grashoff number and implicitly on the gravitational acceleration.

Thermal transfer in the presence of nucleic boiling of liquid, depends on gravitational acceleration, g. Due to the very strong inertia field associated with the rotor of a turbo-engine, the normal heat transfer theories are modified according to the basic principle of General Relativity. Mainly, this modification involves the replacement of gravitational acceleration, g by inertia acceleration, g', which characterizes the rotor frame. The control of the cooling system, which use liquid vaporization and condensation is complex. The coefficient of heat convection from turbine blade to coolant, α, is maximized. To satisfy this condition, vapors present within turbine blades are produced by 'nucleic' boiling and wet. Dry vapors produced by film boiling have a lower convection coefficient within both turbine blades and heat exchanger. Film boiling is a dangerous and difficult process to control. Cooling with liquids that have a high boiling temperature is generally easier to control. Vaporization within turbine blades is generally not recommended for the foregoing reasons. The best liquid may be a metallic alloy having a composition of 25% sodium and 75% potassium. Liquid metals offer the advantage of high coefficients of heat transfer by convection without vaporization. The properties of this liquid at a pressure of 1 Bar are listed in Table 1. The liquid is extensively used in nuclear power plants and nuclear submarines as the agent for heat transfer within the primary circuit.

TABLE 1

Characteristic properties of sodium-potassium alloy

| Description | Value |
|---|---|
| Boiling temperature | 784 □C |
| Freezing temperature | −11 □C |
| Density | 852 kg/m³ |
| Coefficient of heat conductivity | 23.3 W/m-K |
| Specific heat capacity at constant pressure | 955 J/Kg-K |
| Cinematic viscosity | 0.000000607 m²/s |
| Prandtl number | 0.0212 |

Heat transfer has an impact on engine efficiency. Engines having a liquid cooling system of the second embodiment recover the heat absorbed from the turbine rotor without causing energy loss. Neglecting the power consumed by the hydraulic pump and aerodynamic losses within the heat exchanger, it is clear that the cooling system does not reduce the engine efficiency since heat extracted from turbine rotor is re-injected by convection in the air flow after the compressor. In this case, the heat exchanger acts as an integral part of the combustor providing heat to the fluid (air) at an approximately constant pressure.

If a cooling system of the first embodiment is used, the exhaust air that comes from the heat exchanger may be evacuated in front of one of the last stages of the turbine, achieving the same level of energy recovery as in engines having air-cooling systems for turbine blades. Re-injection of this air into the compressor flow increases the power consumed by the compressor since more mechanical work is required to compress hot air. However, the power used to compress cooling air is recovered. Therefore, more fuel may be burned thus increasing the engine power output. The increase in compressor power is low since the amount of heat injected into the compressor flow is small compared to the overall compressor power.

If exhaust air coming from the heat exchanger is re-injected after a predetermined compressor stage, the energy and use of this air for combustion at high temperature, provides a net power gain. Even a modest temperature boost of 300 K (i.e. from 1750 K to 2050 K) at turbine inlet increases the efficiency of an engine with relative cooling by at least 3% compared to a conventional gas turbine.

High temperature at turbine inlet increases blade corrosion. In addition, higher temperature augments the turbulence of burnt gases which is another factor that increases heat transfer and probably the rate of deposition of corrosive particles on blades.

In order to reach high temperatures at turbine inlet, turbine blades need to be protected with advanced overlay coatings. At present, the best overlay coatings are aluminum, platinum, zirconium, chromium, and yttrium based. Ceramic based coatings may provide increased protection since they assure not only protection against corrosion but also provide a thermal barrier. Ceramic based coatings may be advantageous for cooling systems.

To raise the thermal efficiency of gas turbine engines, the temperature at the turbine inlet must be increased. This temperature is limited by the heat transfer capacity of cooling systems that are used for turbine rotors. Liquid cooling is required in order to increase the temperature at turbine inlet beyond 1700 K. The heat transfer coefficients are given by:

$\alpha_{btl}=k_2 n^{0.8}$—for turbine blades to liquid $\alpha_{lhe}=k_3 n^{0.8}$—for liquid to heat exchanger.

When $T_3^*$ increases, n increases and subsequently both coefficients of heat transfer through convection, $\alpha_{bl}$ and $\alpha_{lhe}$ increase, compensating the higher overall flux of heat from burnt gas to turbine blades (due to increased $T_3^*$). For metallic liquids, such as sodium or potassium, the Nusselt number, $Nu_{ml}$ has different values. Assuming turbulent flow:

$$Nu_{ml}=4.9+0.0175(Re \cdot Pr)^{0.8}$$

For the same reasons, both of the coefficients ($\alpha_{bl}$, $\alpha_{lhe}$) increase with temperature at turbine inlet, whereby the operating parameters of the cooling systems self-adjust based on engine load. This feature simplifies the automatic control of the cooling system. The control system may be centrifugal and completely incorporated into the engine rotor. Blade rotation increases both ($\alpha_{btl}$, $\alpha_{lhe}$) coefficients of heat transfer through convection. In air-cooling of turbine blades, the rotational number, Ro, and rotational Rayleigh number, Rra, are used to quantify heat transfer. In the special case of relative cooling, the effect of rotation is more intensive and this problem needs to be investigated based on the basic principles of General Relativity.

Table 2 shows coefficients of heat transfer through forced convection for some, typical situations.

TABLE 2

Coefficients of heat transfer by forced convection, α, for typical cases.

| Cooling fluid | Coefficient of heat transfer through forced convection (w/K-m²) |
|---|---|
| Air (forced circulation) | 10 to 300 |
| Water (forced circulation without vaporization) | 500 to 30000 |
| Water (nucleic boiling) | 2000 to 40000 |
| Metallic liquid (forced circulation without vaporization) | 20000 to 50000 |

The pump body 122 which is fixed on the engine rotor, transmits power to the spindle 132 (FIGS. 11A–11G and 12) through gears 138–144. As an example assume that the engine rotor speed, n, is 16000 rpm and the maximum admissible speed for the spindle of the gear pump, $n^{ad}$, is 4000 rpm. Thus, the relative speed of the $4^{th}$ gear with respect to the engine rotor must be less than 4000 rpm, i.e., the absolute speed of this gear must exceed 12000 rpm. Consequently, the total reduction ratio, $i^{(sum)}$, must exceed 12000/16000=0.75. Reduction may be achieved in two stages with the reduction rates for these two stages being $i^{(1)}$, $i^{(2)}$. Therefore, $$i^{(sum)}=i^{(1)} \cdot i^{(2)}$$

For example, if the first gear has 27 teeth (i.e., $Z_1=27$) and the second has 31 teeth (i.e., $Z_2$ is 31), then the third and fourth gear have $Z_3=27$ and $Z_4=31$, respectively. Therefore:

$$i^{(1)} = \frac{Z_1}{Z_2} = i^{(2)} = \frac{Z_3}{Z_4} = 0.87097$$

$$i^{(sum)} = i^{(1)} \cdot i^{(2)} = 0.7586$$

In this manner, the angular velocity of the $4^{th}$ gear, $n^{(4)}$ is 12137.36 rpm. As a consequence, the relative speed of this gear with respect to the engine rotor is 16000−12137.36= 3862.64 rpm. Therefore, the relative speed of the spindle, a, with respect to the pump casing, is 3862.64 rpm. This value is less than the maximum acceptable speed of 4000 rpm.

Pressure of Liquid Within a Rotating Tank Due to Inertia; Tank Strength

The inertia 'hydrostatic' pressure is given by:

$$p'(r) \int_{r\,min}^{r} \rho r \omega^2 \, dr = \frac{1}{2} \rho \omega^2 [r^2 - r_{min}^2]$$

Therefore, the feeding pressure at pump inlet, $p_{in}$ is given by:

$$p_{in} = p'(r_{in}) + p_0 = \frac{1}{2} \rho \omega^2 [r_{in}^2 - r_{min}^2] + p_0$$

where $p_0$ is the absolute pressure of air or inert gas within the tank 34. This pressure is greater than 1 atm. An inert gas is used instead of air when the cooling liquid may react with oxygen. For example, assume the thermal agent is water (therefore $\rho$=1000 Kg/m$^3$), n=10000 rpm, $p_0$=210000 N/m$^2$. If the maximum and minimum radius of liquid in tank, $r_{min}$ and $r_{max}$ are 0.02 m and 0.1, respectively, the radial position of pump inlet, $r_{in}$=0.04 m, then the feeding pressure at the pump inlet is:

$$p_{in} = \frac{1}{2} 1000 \cdot \left[\frac{\pi 10000}{30}\right]^2 [0.04^2 - 0.02^2] + 21000 = 867973 \; (N/m^2) = 8.7 \text{ bar.}$$

The maximum inertia 'hydrostatic' pressure, $p'_{max}$ is:

$$p'_{max} = \frac{1}{2} 1000 \cdot \left[\frac{\pi 10000}{30}\right]^2 [0.1^2 - 0.02^2] = 5263789 \; (N/m^2) = 52.64 \text{ bar.}$$

The maximum pressure, $p_{max}$ is:

$$p_{max} = p'_{max} + p_0 = 54.74 \text{ bar.}$$

Assume the thickness of the external wall of the tank is $$\delta = 1.5 \text{ mm.}$$

The tensile stress within the external wall of the tank due to this inertia pressure, $\sigma_{tens}$ is (neglecting the effect the internal plates, ribs and frontal and posterior walls):

$$\sigma_{tens} = r_{max} \frac{p_{max}}{\delta} = 365 \; (N/mm^2) < 500 \; N/mm^2,$$

the admissible value for a titanium alloy at 673 K (air pressure around the reservoir fairing was neglected). Although the stress due to inertia pressure is low, the tank must have internal ribs (as in a compressor drum) since the stress caused by centrifugal forces of tank material can reach high values, especially in aeronautical engines. The diameter of the tank is smaller than the diameter of the compressor; therefore mechanical stress is smaller within the former. On the other hand, the tank which is exposed to higher temperatures has increased thermal stress. This is especially true when a liquid metal is used as coolant agent.

Evaluation of Cooling of $1^{st}$ Turbine Stage Using a First Embodiment Heat Exchanger Assume metallic liquid with 25% Na and 75% Ka is used for cooling (the physical properties of this liquid are listed in Table 1).

TABLE 3

Parameters of ideal engine cycle (neglecting losses).

| Parameter description | Parameter name and expression | Parameter value and units |
|---|---|---|
| Total temperature of burnt gases at turbine inlet | $T_3^*$ | 2050 (K) |
| Total temperature of ambient air | $T_1^*$ | 273 (K) |
| Mass flow of air | $M_a$ | 15.7 (Kg/s) |
| Total pressure of ambient air | $P_1$ | 1 (bar) |
| Total pressure of burnt gases at engine exit | $P_5^* = P_1^*$ | 1 (bar) |
| Ratio of maximum and ambient temperature | $t = T_3^*/T_1^* = 2050/273$ | 7.5 (dimensionless) |
| Optimum compressor ratio[22] | $\pi_c^{opt} = t^{(k/[2(k-1)])} =$ $7.5^{1.4/[2(1.4-1)]}$, where the adiabatic constant of air, k, is 1.4 | 34 (dimensionless) |
| Total temperature at combustor inlet | $T_2^* = T_1^* \cdot (\pi_c^{opt})^{(k-1)/k} =$ $273 \cdot (34)^{(1.4-1)/1.4}$ | 748 (K) |
| Total pressure at combustor inlet | $P_2^*$ | 34 (bar) |
| Total pressure at turbine inlet | $P_3^* = P_2^*$ | 34 (bar) |
| Total temperature of burnt gases at engine exit | $T_5^* = T_3^* \cdot (P_5^*/P_3^*)^{(k-1)/k} =$ $2050 \cdot (1/34)^{(1.4-1)/1.4}$ | 748 (K) |
| Engine power | $Pe = c_p(T_3^* - T_2^* + T_1^* - T_5^*)M_a = 1000(2050 - 748 + 273 - 748)15.7$ | 12984 (kW) |

TABLE 4

Parameters of first turbine stage (neglecting losses), see FIG. 14 and Table 3

| Parameter description | Parameter name and expression | Parameter value and units |
|---|---|---|
| Drop in specific enthalpy | $\Delta i$ | 300 (kJ/kg) |
| Critical pressure | $P_{cr} = P_3^*[2/(k+1)]^{k/(k-1)}$ | 18 (bar) |
| Static pressure at exit from turbine vane | $P_3^* = P_{cr}$ | 18 (bar) |
| Critical temperature | $T_{cr} = 2T_3^*/(k+1)$ | 1708 (K) |
| Static pressure at exit from turbine vane | $T_3^* = T_{cr}$ | 1708 (K) |
| Critical density of burnt gases | $\rho_{cr} = Pcr/RT_{cr}$ | 3.7 (Kg/m$^3$) |
| Density of burnt gases at exit from turbine vane | $\rho_3 = \rho_{cr}$ | 3.7 (Kg/m$^3$) |
| Speed of turbine rotor measured at median blade radius | u | 200 (m/s) |

TABLE 4-continued

Parameters of first turbine stage (neglecting losses), see FIG. 14 and Table 3

| Parameter description | Parameter name and expression | Parameter value and units |
|---|---|---|
| Angle between engine axis and direction of gas flow at vane exit | b | 25 (degrees) |
| Speed of burnt gases at rotor entrance | $w_3$ | 652 (m/s) |
| Speed of burnt gases at rotor exit | $w_4$ | 782 (m/s) |
| Total temperature of burnt gases at rotor entrance | $T_{3w}^* = T_3 + w_3^2/2c_p = 1708 + 212$ | 1920 (K) |
| Density of burnt gases at rotor exit | $\rho_4 = P_4/RT_4 = 14.8 \cdot 10^5/(287 \cdot 1614)$ | 3.2 (Kg/m³) |
| Mean speed of burnt gases within rotor | $w_m = (w_3 + w_4)/2 = (652 + 782)/2$ | 717 (m/s) |
| Mean density of burnt gases within rotor | $\rho_m = (\rho_3 + \rho_4)/2 = (3.7 + 3.2)/2$ | 3.5 (Kg/m³) |
| Mean temperature of burnt gases within rotor | $T_{mg} = (T_{3'} + T_4)/2 = (1708 + 1614)/2$ | 1661 (K) |
| Mean effective temperature of burnt gases [12] | $T_{meg} = T_{mg} + 0.85 w_m^2/2c_p = 1661 + 0.85 \cdot 717^2/(2 \cdot 1000)$ | 1879 (K) |
| Prandtl number (assumed to be constant) [12] | Pr | 0.71 (dimensionless) |
| Coefficient of viscosity of burnt gases at mean effective temperature, $T_{meg}$ [13] | $\mu_m$ | $6.0409 \cdot 10^{-5}$ (kg/m · s) |
| Kinematic viscosity of burnt gases at mean effective temperature | $v_m = \mu_m/\rho_m = 6.0409 \cdot 10^{-5}/3.5$ | $1.72597 \cdot 10^{-5}$ (m²/s) |
| Reynolds number (assumed to be constant) | $Re = w \cdot d^*/v_m = w_m l_{bc} \rho_m/\mu_m = 717 \cdot 0.025 \cdot 3.5/60409 \cdot 10^{-5}$ | $1.038 \cdot 10^6$ |

TABLE 5

Rotor dimensions that affect heat transfer

| Parameter description | Parameter name and expression | Parameter value and units |
|---|---|---|
| Thickness of turbine blade wall | $\delta$ | 0.0012 (m) |
| Number of blades | $n^{(b)}$ | 50 (dimensionless) |
| Diameter of turbine rotor at blade basis | $D_{bb}$ | 200 (mm) |
| Length of turbine blade chord | $l_{bc}$ | 25 (mm) |
| External perimeter of turbine blade | $P_{eb}$ | 73.9 (mm) |
| Height of turbine blade | $h_{bl}$ | 20 (mm) |
| Total external area of all blades including blade platforms | $S_{teab} = (\pi D_{bb} l_{bc} + n^{(b)} h_{bl} \cdot Peb) = (\pi \cdot 200 \cdot 25 + 50 \cdot 20 \cdot 73.9) \cdot 10^{-6}$ | 0.089608 (m²) |
| Area of internal surface of all blades involved in heat transfer to liquid coolant | $S_{isb} = 20 \cdot n^{(b)} \cdot \Sigma P_{hc}^{(i)} = 20 \cdot 50 \cdot (15.6 + 16.02 + 21.03 + 14.9 + 10.65 + 8.17 + 7.15)$ | 93520 (mm²), i.e., 0.09352 (m²) | shows the characteristics of the ideal engine cycle that was considered (losses are neglected). Results shown in Table 4 characterize gas flow through the first turbine stage. Blade dimensions and material properties that are important for heat transfer are listed in Table 5. FIG. 2 shows the main dimension of turbine stage no. 1.

Having a high coefficient of heat transfer through convection, the liquid coolant absorbs the entire heat transferred from burnt gases to turbine blades. This coefficient increases with speed and turbulence of liquid flow. In fact, $\alpha_{btl}$ has an even higher value than listed above due to rotation. The liquid has enough heat capacity to absorb heat to cool both the first and second turbine stage, because the temperature of coolant within blade exit may exceed 1053 K due to effect of inertia forces, which raise the coolant pressure within the rotor and therefore the boiling point.

Burnt gases with high temperature cause increased temperature gradients within the blade metal. No known cooling method has been found to avoid this problem. To sustain high temperature gradients, rotor blades should be manufactured from composite metallic materials or mono-crystals having high heat conductivity and strength. Composite materials containing fibers of wolfram or molybdenum have high heat conductivity and capacity to tolerate thermal stress. Whiskers formed of mono-crystal filaments of wolfram and molybdenum increase blade strength. The dimensions of the heat exchanger are listed in Table 6.

TABLE 6

Dimensions of heat exchanger

| Parameter description | Parameter name and expression | Parameter value and units |
|---|---|---|
| Length of heat exchanger | $L_{he}$ | 0.5 (m) |
| Length of blade chord of heat exchanger | $L_{bche}$ | 0.5 (m) |
| External diameter of blades of heat exchanger | $D_{ebhe}$ | 166.7 (mm) |
| Inner diameter of blade of heat exchanger | $D_{ibhe}$ | 102.8 (mm) |
| Height of throat section of a blade of heat exchanger | $h_{he}$ | 0.029 (m) |
| Width of throat section of a blade of heat exchanger | $l_{he}$ | 0.003 (m) |

TABLE 6-continued

Dimensions of heat exchanger

| Parameter description | Parameter name and expression | Parameter value and units |
|---|---|---|
| Number of blades | $n_{bhe}^{(b)}$ | 30 (dimensionless) |
| Step between circular ribs | $s_r$ | 1.2 (mm) |
| Thickness of a circular rib | $\delta_r$ | 0.2 (mm) |
| Wall thickness of blade | $\delta_{heb}$ | 0.0015 (m) |
| Throat area of a blade of heat exchanger | $H_{he} = h_{he} \cdot l_{he} = 0.029 \cdot 0.003$ | 0.000087 ($m_2$) |
| Blade perimeter | $P_{he} = 2(h_{he} + l_{he}) = 2(0.029 + 0.003)$ | 0.064 (m) |
| Mean diameter of circular ribs (diameter of mean rib) | $D_{mr} = (D_{ebhe} + D_{ibhe})/2 = (166.7 + 102.2)/2$ | 134.75 (mm) |
| Equivalent dimension for calculation of heat transfer through convection from liquid to heat exchanger | $d^* = 4\dfrac{H_{he}}{P_{he}} = 4\dfrac{0.000087}{0.064}$ | 0.0054 (m) |
| Area of inner surface | $S_{ishe} \approx n_{bhe}^{(b)} \cdot P_{he} \cdot L_{bche} = 30 \cdot 0.064 \cdot 0.5$ | 0.96 ($m^2$) |
| Area involved in heat conduction | $S_{cd} = S_{ishe}$ | 0.96 ($m^2$) |
| Inlet area of cooling air in heat exchanger. Note: Inlet area is equal to exit area $S_{aehe}$ because the heat exchanger is cylindrical | $S_{aine} = \dfrac{s_r - \delta_r}{s_r} \cdot \left[\left(\dfrac{D_{ebhe}}{2}\right)^2 - \left(\dfrac{D_{ibhe}}{2}\right)^2\right] -$ $\dfrac{s_r - \delta_r}{s_r} \cdot n_{bhe}^{(b)} \cdot d_{heb} \cdot \left(\dfrac{D_{ebhe}}{2} - \dfrac{D_{ibhe}}{2}\right) =$ $\dfrac{1.2 - 0.2}{1.2} \cdot \pi \cdot \left[\left(\dfrac{166.7}{2}\right)^2 - \left(\dfrac{102.8}{2}\right)^2\right] -$ $\dfrac{1.2 - 0.2}{1.2} \cdot 30 \cdot 6 \cdot \left(\dfrac{166.7}{2} - \dfrac{102.8}{2}\right)$ | 6479 ($mm^2$), i.e., 0.006479 ($m^2$) |
| External surface of all heat exchanger blades | $S_{sebhe} = 2 n_{bhe}^{(b)} L_{bche} \dfrac{(D_{ebhe} - D_{ibhe})}{2} +$ $\pi L_{bhe} D_{ibhe} = 2 \cdot 30 \cdot 500 \dfrac{166.7 - 102.8}{2} +$ $\pi \cdot 500 \cdot 102.8$ | 1119977.9 ($mm^2$), i.e., 1.1027 ($m^2$) |
| External surface of all circular ribs | $S_{erhe} = 2 \cdot \sum_{i=0}^{25} \pi D_{ri} L_{bche} = 2 \cdot \pi \cdot L_{bche} \cdot$ $\sum_{i=0}^{25} D_{ri} = 2 \cdot \pi \cdot L_{bche} \sum_{25}^{25} (D_{r0} + 25 \cdot s_r) =$ $2 \cdot \pi \cdot 500 \cdot \sum_{i=0}^{25} (105 + 25 \cdot 1.2) = 2 \cdot \pi \cdot 500 \cdot 3510$ | 11026990 ($mm^2$), i.e., 11.027 ($m^2$) |
| Overall external surface of heat exchanger | $S_{eshe} = S_{sebhe} + S_{erhe} = 1.12 + 11.027$ | 12.147 ($m^2$) |

Evaluation of Engine Thermal Efficiency.

In this section, thermal efficiency of engines using relative cooling systems is compared to that of engines using conventional air-cooling. The assumed temperature at turbine inlet is $T_3^* = 2050$ K for an engine with relative cooling (only the 1st turbine stage is cooled with liquid, the other turbine stages are air-cooled as usual). Assume $T_3^* = 1750$ K for a conventional engine with normal air-cooling (turbine stages, including number 1 are air-cooled). The power lost by both engines due to conventionally air-cooling is neglected. In the case that a heat exchanger of the first embodiment is used and the hot air from heat exchanger unit is exhausted directly into atmosphere or is expanded in the latter turbine stages, the assumed airflow is: $M'_a = M_a - M_{ca} = 15.7 - 1.753 = 13.95$ kg/s. For engines which use conventional air cooling, the overall efficiency is much lower than the thermal efficiency, due to losses (currently no more than 42%). If the hot air from exit of heat exchanger of the first embodiment is evacuated into the atmosphere, the thermal efficiency of the engine is low. This inefficiency is due to the extraction of excessive heat from turbine for cooling. Therefore, the advantage of higher temperature at turbine inlet is cancelled when the temperature of burnt gases is high. If at least a portion of the heat extracted from turbine and power consumed to compress cooling-air are recovered by expansion of hot air coming from the first embodiment heat exchanger within the latter turbine stages, the thermal efficiency of the engine is increased. Engines cooled with air also recover a portion of this energy. Nevertheless, for the same gain in efficiency, the relative cooling systems offer the advantage of more intensive heat transfer within turbine blades, increased $T_3^*$ and therefore increased power.

Figure 18:
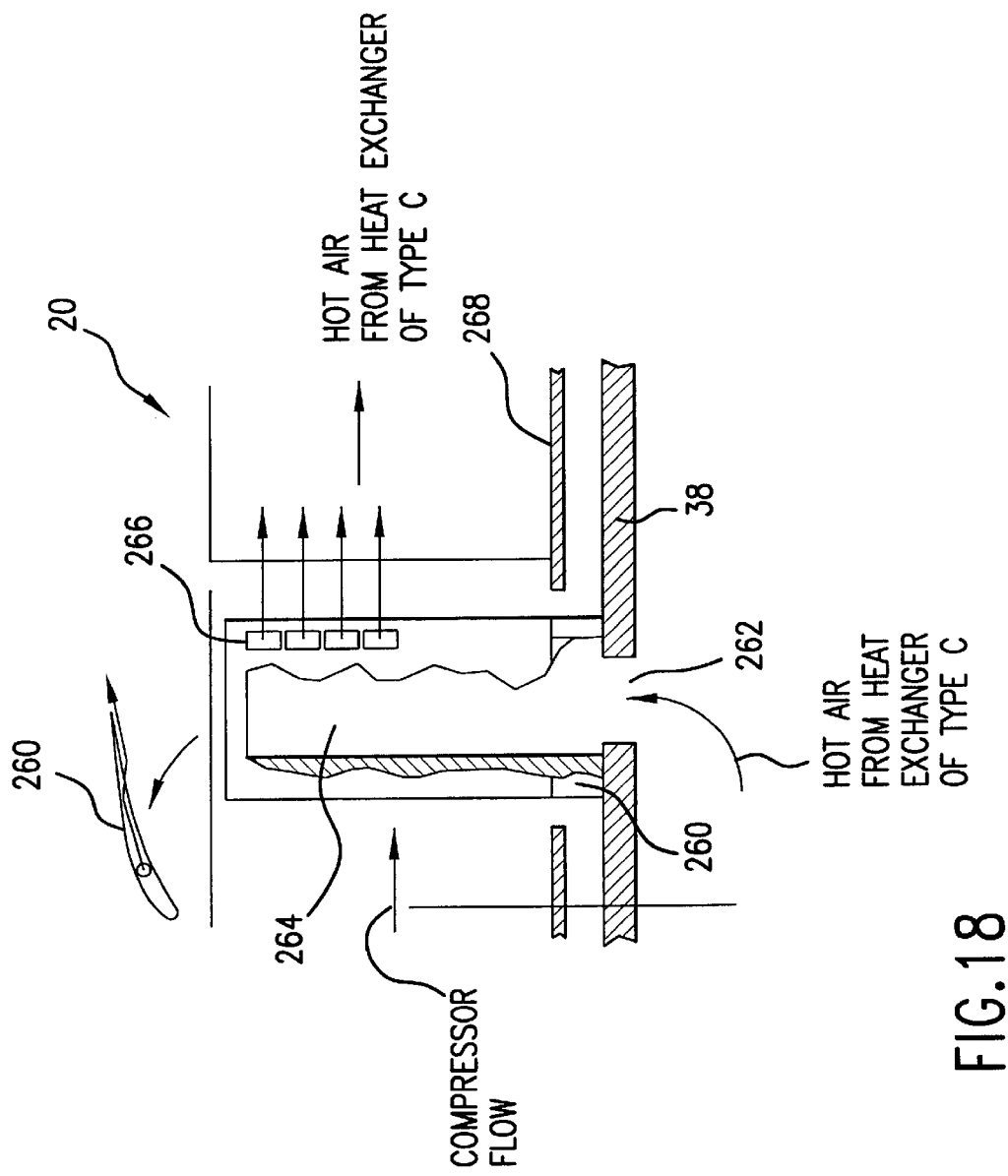
FIG. 18 shows schematically the principles of recovery of heat extracted from turbine for cooling.

Relative cooling systems offer an innovative way to increase thermal efficiency. The energy extracted during the cooling process may be re-injected into the compressor flow. There are two methods of re-injecting this energy:

1. Hot air coming from the heat exchanger of the first embodiment may be re-injected into a previous compressor stage as shown in FIG. 18. The hot air from a heat exchanger specified as the first embodiment (placed within the compressor drum 38) enters the compressor blade 260 through the radial hole or opening 262. The hot air then passes through the hollow 264, enters the tip area of blade and exits through the axial holes 266 on the pressure side of blade. In this way, the mixing of re-injected air with the compressor flow does not produces a large power loss and re-extraction of hot air for cooling in the following stage is prevented. To minimize the power loss due to mixing of re-injected air with the compressor flow, the pressure and speed of hot air exhausted through holes 266 is made comparable to those of the compressor flow at the injection point. The injection blade has an increased chord and thickness and has the dual function of compressing the airflow and re-injection of the hot air coming from heat exchanger. The hot air may be re-injected in a compressor vane 268. This solution has disadvantages since the pressure losses are higher due to increased turbulence generated by the transfer of air from the compressor drum (rotating) to the vane (fixed).

As a first example, cooling air may be extracted after the $5^{th}$ compressor stage, cools the heat exchanger and then is re-injected subsequent to the $4^{th}$ compressor stage. In a second example, cooling air may be extracted after the $12^{th}$ stage and is then re-injected after the $11^{th}$ stage. Cooling-air may be taken from the $12^{th}$ stage, since the mean temperature of the external surface of heat exchanger is high (about 700 K).

Assuming the airflow of the engine with relative cooling and re-injection of heat is the overall airflow (justified by air re-injection) and further that the fuel flow is the same as for the case of an engine without cooling but with the same compressing ratio, temperature $T_3^*$ and air flow.

If re-injection of heat extracted from turbine occurs at a constant pressure, the efficiency of the engine with relative cooling is affected only by the increased compressor work caused by heat injection. It has been found that the thermal efficiency of engine increases when air is re-injected into the latter compressor stages. If the compression ratio of all stages after re-injection point, $\pi_{c,ainj} \cong 1$, the injection of heat has little effect on compressor power and the thermal efficiency is substantially equal to the theoretical maximum. However, in the case of a heat exchanger of the first embodiment, this efficiency cannot be achieved due to the loss of pressure of cooling air within the heat exchanger. Using a heat exchanger of the second or third embodiments, no air is extracted from the compressor, since the heat exchanger is substantially 'immersed' in the compressor flow. The engine cycle is the same as for an engine with a heat exchanger of the first embodiment, however, the efficiency is higher since the extraction and re-injection of air is no longer required and the cooling process can be 'pushed' to the later compressor stages.

It is to be noted that:

1. If a heat exchanger of the first embodiment is used and the hot air expands within the later turbine stages, the engine efficiency is similar with that obtained using a conventional cooling system with air.
2. Conventional cooling cannot provide high gas temperature at turbine inlet. Aside from increased engine efficiency, relative cooling provides increased specific power and reduces overall engine dimensions and specific weight. These advantages are especially significant for aeroengines. It is more efficient to re-inject energy into the compressor flow than to expand cooling air within latter turbine stages since air re-injected into the compressor may be used for combustion. The increased thermal efficiency of the engine with relative cooling and re-injection of heated air within the compressor becomes significant if hot air is re-injected within the latter compressor stages with thermal efficiencies possibly within 2–3% of the ideal value.
3. The temperature of metallic liquid at exit from heat exchanger must be as high as possible to maximize the engine efficiency.

An engine with a heat exchanger of the second embodiment has a nearly maximum efficiency (theoretical efficiency) since the heat from turbine rotor is completely recovered without increasing the compressor power and there is further no need to extract and re-inject air into compressor flow. The blade of the second embodiment exchanger has a structure similar to that of a turbine blade (FIGS. 11A–11B).

The convection coefficient for heat transfer from hot liquid to the blade of heat exchanger and the convection coefficient for heat transfer from turbine blade to cold liquid may be approximately equal. Nevertheless the heat transfer area of the heat exchanger should exceed the external area of turbine blades, since the convection coefficient for heat transfer from a blade of the heat exchanger to the compressor airflow is lower than for heat transfer from burnt gases to turbine blade. In addition, the temperature difference between hot liquid within a heat exchanger blade and air is smaller than between burnt gases and cold liquid within a turbine blade. In the cycle of an engine with a heat exchanger of the second embodiment, the parameters of the engine cycle are generally the same when taken with respect to those of the ideal engine (see Table 3).

Although this invention has been described in connection with specific forms and embodiments thereof, it will be appreciated that various modifications other than those discussed above may be resorted to without departing from the spirit or scope of the invention as defined in the appended Claims. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A liquid cooling system in a gas turbine including a compressor section having a compressor drum and compressor blades, a combustion section fluidly coupled to said compressor section, a turbine rotor and a turbine stator, said turbine rotor having a rotor shaft, at least one rotor disk on said rotor shaft, and rotor blades arranged on said at least one rotor disk, comprising:

a tank having an inlet and an outlet and containing a cooling liquid therein, a coolant pump coupled to said tank to extract said cooling liquid therefrom for forced circulation of said cooling liquid through said at least one rotor disk and said rotor blades, and a heat exchanger fluidly coupled by an inlet thereof to said at least one rotor disk and said rotor blades, and by an output thereof to said tank for cooling said liquid returning from said at least one rotor disk and said rotor blades and for supplying said cooled liquid to said tank, said tank, said coolant pump, and said heat exchanger being incorporated into said turbine rotor.

2. The liquid cooling system of claim 1, further comprising:

a system of intake and output channels extending within said rotor shaft, said at least one rotor disk and said rotor blades, each at said intake channels being fluidly coupled to a respective one of said output channels;

said inlet of said heat exchanger being coupled to said output channels to receive a heated said cooling liquid therefrom.

3. The liquid cooling system of claim 1, wherein said coolant pump is actuated responsive to relative motion between said stator and said rotor.

4. The liquid cooling system of claim 1, wherein said heat exchanger is positioned in said compressor drum.

5. The liquid cooling system of claim 2, wherein said heat exchanger is positioned at the end of said compressor stage, said heat exchanger including cooling blades having ducts formed therethrough and coupled to said output channels, the heated liquid delivered to said cooling blades ducts transferring the heat associated therewith to said cooling blades of said heat exchanger.

6. The liquid cooling system of claim 2, wherein said heat exchanger is positioned in said compressor drum, said compressor blades including transfer ducts formed therein for said coolant liquid to pass therethrough, said transfer ducts being fluidly coupled between said output channels and said inlet of said tank.

7. The coolant system of claim 1, wherein said coolant pump includes a pump for forced recirculation of the coolant liquid.

8. The coolant system of claim 1, wherein said cooling pump includes a rotating pump body and an adjusting unit coupled to said rotating pump body for adjusting the speed of said cooling pump.

9. The coolant system of claim 1, wherein said tank includes a rotating tank.

10. The coolant system of claim 4, wherein said heat exchanger is formed as a casting made from either a heat resistant steel, super alloy, or titanium alloy.

11. The coolant system of claim 4, wherein said heat exchanger includes hollow blades, and brazed cylindrical ribs, extending between said hollow blades on the external surface of said heat exchanger.

12. The coolant system of claim 5, wherein said cooling blades of said heat exchanger are made of heat resistant steel or super alloy.

13. The coolant system of claim 2, wherein said intake and output channels are made from super alloy.

14. The coolant system of claim 5, wherein said ducts are made from a heat resistant steel.

15. The coolant system of claim 1, wherein said coolant liquid includes a metallic alloy having a composition of 25% of sodium and 75% of potassium.

* * * * *